United States Patent
Sasaki et al.

(10) Patent No.: US 9,709,729 B2
(45) Date of Patent: Jul. 18, 2017

(54) MULTICORE FIBER WITH DIFFERENT-MODE INTERACTION SECTION

(71) Applicants: FUJIKURA LTD., Tokyo (JP); NATIONAL UNIVERSITY CORPORATION HOKKAIDO UNIVERSITY, Sapporo-shi, Hokkaido (JP)

(72) Inventors: Yusuke Sasaki, Sakura (JP); Hitoshi Uemura, Sakura (JP); Katsuhiro Takenaga, Sakura (JP); Kunimasa Saitoh, Sapporo (JP)

(73) Assignees: FUJIKURA LTD., Tokyo (JP); NATIONAL UNIVERSITY CORPORATION HOKKAIDO UNIVERSITY, Sapporo-shi, Hokkaido (JP)

( * ) Notice: Subject to any disclaimer, the term of this patent is extended or adjusted under 35 U.S.C. 154(b) by 0 days.

(21) Appl. No.: 15/062,582

(22) Filed: Mar. 7, 2016

(65) Prior Publication Data
US 2016/0187577 A1    Jun. 30, 2016

Related U.S. Application Data

(63) Continuation of application No. PCT/JP2015/055489, filed on Feb. 25, 2015.

(30) Foreign Application Priority Data

Feb. 25, 2014  (JP) ................. 2014-034006

(51) Int. Cl.
*G02B 6/02* (2006.01)
*G02B 6/028* (2006.01)
(Continued)

(52) U.S. Cl.
CPC ....... *G02B 6/02042* (2013.01); *G02B 6/0288* (2013.01); *G02B 6/268* (2013.01);
(Continued)

(58) Field of Classification Search
CPC ... G02B 6/02042; G02B 6/268; G02B 6/0288
(Continued)

(56) References Cited

U.S. PATENT DOCUMENTS 4,315,666 A    2/1982  Hicks, Jr.
4,759,613 A *  7/1988  Fox .......................... G02F 1/11
                                                          359/313
(Continued)

FOREIGN PATENT DOCUMENTS

JP    55-126209 A    9/1980
JP    2005-10375 A   1/2005
(Continued)

OTHER PUBLICATIONS

Uemura et al., "LP01/LP11 mode multiplexer/demultiplexer using a multi-core fiber", Program of the 2014 IEICE General Conference, 2014.
(Continued)

*Primary Examiner* — Akm Enayet Ullah
(74) *Attorney, Agent, or Firm* — Westerman, Hattori, Daniels & Adrian, LLP

(57) ABSTRACT

A multicore fiber 1 includes: a small diameter portion 33 in which a propagation constant of light of an $x_1$-th order LP mode of the first core 11 (here, $x_1$ is an integer of "2" or more and x or less, x is an integer of "2" or more) and a propagation constant of light of a y1-th order LP mode of the second core 12 (here, $y_1$ is an integer of "1" or more and y or less other than $x_1$, y is an integer of "1" or more) coincide with each other and a large diameter portion in which a propagation constant of light of each LP mode of the first
(Continued)

core 11 and a propagation constant of light of each LP mode of the second core 12 are configured not to coincide with each other are arranged.

20 Claims, 12 Drawing Sheets

(51) Int. Cl.
    *G02B 6/26* (2006.01)
    *G02B 6/287* (2006.01)
    *G02B 6/14* (2006.01)
    *G02B 6/28* (2006.01)

(52) U.S. Cl.
    CPC ................ *G02B 6/287* (2013.01); *G02B 6/14* (2013.01); *G02B 2006/2839* (2013.01)

(58) Field of Classification Search
    USPC ............................................ 385/14, 24, 126
    See application file for complete search history.

(56) References Cited

U.S. PATENT DOCUMENTS

| | | | | |
|---|---|---|---|---|
| 4,915,468 | A * | 4/1990 | Kim ...................... | G01D 5/344 385/123 |
| 4,961,195 | A * | 10/1990 | Skupsky .................. | G02F 1/37 359/328 |
| 6,631,224 | B2 * | 10/2003 | Sorin ................ | G02B 6/02071 385/140 |
| 2005/0013572 | A1 | 1/2005 | Guan et al. | |
| 2011/0188855 | A1 * | 8/2011 | Kokubun ........... | G02B 6/02042 398/43 |
| 2013/0156393 | A1 * | 6/2013 | Kokubun ........... | G02B 6/02042 385/126 |
| 2013/0216194 | A1 * | 8/2013 | Sun .................... | G02B 6/02214 385/115 |
| 2014/0093205 | A1 * | 4/2014 | Gruner-Nielsen ... | G02B 6/0288 385/43 |
| 2014/0119694 | A1 * | 5/2014 | Abedin .............. | G02B 6/02042 385/43 |

FOREIGN PATENT DOCUMENTS

| | | |
|---|---|---|
| JP | 2012-194362 A | 10/2012 |
| JP | 2013-37017 A | 2/2013 |

OTHER PUBLICATIONS

Takenaga et al., "Multicore fibre-based Mode Multiplexer/Demultiplexer for Three-Mode Operation of LP01, LP11a, and LP11b", ECOC 2014 (3 pages).

Uemura et al., "LP01/LP11a/LP11b mode multiplexer/demultiplexer using a multi-core fiber", IEICE 2014 (1 page).

Lin et al., "Design Theory and Experiment of a LP01-LP11 Mode Converter Utilizing Fused Tapered Fiber Coupler", IEICE, Oct. 25, 1999, vol. J82-C-I, No. 10, pp. 587 595.

Li et al., "Low-Loss Fused Mode Coupler for Few-Mode Transmission", OFC, OTu3G4, 2013, OFC/NFOEC Technical Digest, (3 pages).

International Search Report dated Apr. 7, 2015 issued in counterpart PCT application No. PCT/JP2015/055489 (2 pages).

Song, Kwang Yong et al., "High Performance Fused-type Mode Selective Coupler for Two-mode Fiber Devices", OFC, Technical Digest Postconference Edition, Mar. 7, 2000, pp. TUB5-01 to TUB5-3.

Tjugiarto T. et al., "Bandpass Filtering Effect in Tapered Asymmetrical Twin-core Optical Fibres", Electronics Letters, vol. 29, No. 12, Jun. 10, 1993 (Jun, 10, 1993), pp. 1077-1078.

Love, John D. and Riesen, Nicolas, "Mode-selective couplers for few-mode optical fiber networks", Optics Letters, vol. 37, No. 19, Oct. 1, 2012, pp. 3990-3992.

Sasaki, Yusuke et al., "Multicore fiber-based mode multiplexer/demultiplexer", Optomechatronic Micro/Nano Devices and Components III, Oct. 8-10, 2007, vol. 9389, Jan. 15, 2015, pp. 938905-1-938905-9.

European Search Report dated Mar. 21, 2017, issued in counterpart application No. EP15754524.5.

\* cited by examiner

LARGE DIAMETER PORTION 31 SIDE

SMALL DIAMETER PORTION 33 SIDE

MULTICORE FIBER WITH DIFFERENT-MODE INTERACTION SECTION

TECHNICAL FIELD

The present invention relates to a multicore fiber and is very suitable for a case where light of mutually-different modes is multiplexed/demultiplexed.

BACKGROUND ART

In optical communication using an optical fiber, multi-mode communication has been known which performs information communication by superimposing information on light of an LP01 mode (basic mode) and superimposing information on light of an LP mode of a higher order than that of the basic mode such as an LP11 mode. In the multi-mode communication, light of a plurality of LP modes propagating through one core is demultiplexed into a plurality of optical fibers, and light of mutually-different LP modes propagating through a plurality of optical fibers is multiplexed into one optical fiber.

In Non Patent Literature 1 described below, it has been described that, in a case where light of a same LP mode is propagated through one set of optical fibers, light propagating through the optical fibers is multiplexed as mutually-different LP modes by using a mode converter or the like.

In addition, a mode multiplexer/demultiplexer disclosed in Patent Literature 1 described below includes two waveguides. Between the waveguides, one waveguide propagates light of a specific LP mode, and the other waveguide propagates light of a specific LP mode and light of an LP mode other than the specific LP mode. In a case where light of a same specific LP mode propagates through such waveguides, a propagation constant of one waveguide for light of the specific LP mode and a propagation constant of the other waveguide for light of the other LP mode are configured to coincide with each other. According to such a configuration, the light of the specific LP mode of one waveguide is multiplexed as light of the other LP mode of the other waveguide. The Light of the specific LP mode is originally propagated through the other waveguide, and, as a result, light of an LP mode other than the light of the specific LP mode is propagated through the other waveguide. In this way, in a case where light of a same LP mode is propagated through a plurality of optical waveguides without using a mode converter, each light can be propagated as light of mutually-different modes through one waveguide.
[Non Patent Literature 1] An Li et al., "Low-Loss Fused Mode Coupler for Few-Mode Transmission", OFC, OTu3G4 (2013)
[Patent Literature 1] JP-A-2013-37017

SUMMARY OF INVENTION

In the mode multiplexer/demultiplexer disclosed in Non Patent Literature 1, a mode converter is required. In addition, in the mode multiplexer/demultiplexer disclosed in Patent Literature 1, waveguides are located adjacent to each other for an occurrence of mode multiplexing/demultiplexing in a place in which mode multiplexing/demultiplexing is performed, and the waveguides are separate far from each other so as not to cause an occurrence of mode multiplexing/demultiplexing. Accordingly, the mode multiplexer/demultiplexer disclosed in Non Patent Literature 1 needs a place for arranging the mode converter. In addition, the mode multiplexer/demultiplexer disclosed in Patent Literature 1 needs a place used for separating the waveguides from each other in a place in which mode multiplexing/demultiplexing is not performed.

An object of the present invention is to realize a mode multiplexer/demultiplexer of which the size can be decreased using a multicore fiber.

To achieve the above object, a multicore fiber of the present invention includes: a first core that propagates light of up to an x-th order LP mode (here, x is an integer of "2" or more); and a second core that propagates light of up to a y-th order LP mode (here, y is an integer of "1" or more), and a different-mode interaction section in which a propagation constant of light of an $x_1$-th order LP mode of the first core (here, $x_1$ is an integer of "2" or more and x or less) and a propagation constant of light of a $y_1$-th order LP mode of the second core (here, $y_1$ is an integer of "1" or more and y or less other than $x_1$) coincide with each other and a different-mode non-interaction section in which a propagation constant of light of each LP mode of the first core and a propagation constant of light of each LP mode of the second core are configured not to coincide with each other are arranged.

In the different-mode interaction section of this multicore fiber, a propagation constant of light of a specific LP mode of the second core (here, light of the $y_1$-th order LP mode) and a propagation constant of light of another LP mode of the first core (here, light of the $x_1$-th order LP mode) that is different from light of one specific LP mode coincide with each other. Accordingly, in the different-mode interaction section, the light of the specific LP mode of the second core can be multiplexed in the mode as light of another mode of the first core, or the light of another LP mode of the first core can be demultiplexed in the mode as light of the specific mode of the second core. The first core can propagate light of at least up to the second-order LP mode and thus, can propagate light of multi-modes. Accordingly, the first core can propagate, in addition to the light of the specific LP mode, light of an LP mode different from the light of the specific LP mode. In this way, mode multiplexing/demultiplexing can be performed. For example, in a case where the first core propagates light of up to the second-order LP mode, and the second core propagates light of up to the first-order LP mode, light of the LP01 mode propagating through the second core and light of the LP11 mode of the first core are multiplexed/demultiplexed in the mode in the different-mode interaction section. In addition, light of the LP01 mode propagating through the first core propagates through the first core without being multiplexed/demultiplexed.

In addition, in the different-mode non-interaction section of this multicore fiber, a propagation constant of light of each LP mode of the second core and a propagation constant of light of each LP mode of the first core do not coincide with each other. For this reason, in the different-mode non-interaction section, the occurrence of mode multiplexing/demultiplexing can be suppressed without separating the first core and the second core from each other unlike Patent Literature 2.

Thus, according to this multicore fiber, a mode multiplexer/demultiplexer that can be decreased in size can be realized.

In addition, it is preferable that the multicore fiber further includes: a third core that propagates light of up to a z-th order LP mode (here, z is an integer of "1" or more) and is arranged at a position different frost a position of the second core by a predetermined angle using the center of the first core as a reference, and, in the different-mode interaction section, the propagation constant of the light of the $x_1$-th order LP mode of the first core and a propagation constant of light of a $z_1$-th order LP mode of the third core (here, $z_1$ is an integer of "1" or more and z or less other than $x_1$) coincide with each other, in the different-mode non-interaction section, a propagation constant of light of each LP mode of the first core and a propagation constant of light of each LP mode of the third core do not coincide with each other, and the light of the $x_1$-th order LP mode is configured to be light acquired by adding two units of light of a same LP mode, which have mutually-different energy distributions in the case of being rotated to be different from each other by the predetermined angle using the center of the first core as a reference, in a state of being rotated to be different from each other by the predetermined angle using the center of the first core as a reference.

According to such a configuration, in the different-mode interaction section, light of the $y_1$-th order LP mode propagating through the second core and light of one LP mode configuring light of the $x_1$-th order LP mode of the first core can be multiplexed/demultiplexed, and light of the $z_1$-th order LP mode propagating through the second core and light of the other LP mode configuring the light of the $x_1$-th order LP mode of the first core can be multiplexed/demultiplexed. Therefore, mode multiplexing/demultiplexing of a further larger amount of light can be performed.

In this case, it is preferable that the predetermined angle is 90 degrees, and the $x_1$-th order LP mode is a second-order LP mode. Alternatively, it is preferable that the predetermined angle is 45 degrees, and the $x_1$-th order LP mode is a third-order LP mode. Light of an LP11 mode that is a second-order LP mode and light of an LP21 mode that is a third-order LP mode are low order modes among light of modes other than the basic mode and can be easily handled. Accordingly, optical communication can be performed in an easy manner.

In addition, it is preferable that the multicore fiber further includes: a third core that propagates light of up to a z-th order LP mode (here, z is an integer or "1" or more), and x is an integer of "3" or more, in the different-mode interaction section, a propagation constant of light of an $x_2$-th order LP mode of the first core (here, $x_2$ is an integer of "1" or more and x or less other than $x_1$) and a propagation constant of light of a $z_1$-th order LP mode of the third core (here, $z_1$ is an integer of "1" or more and z or less other than $x_1$ and $x_2$) coincide with each other, and in the different-mode non-interaction section, a propagation constant of light of each LP mode of the first core and a propagation constant of light of each LP mode of the third core do not coincide with each other.

Light of different two LP modes propagating through the first core, light propagating through the second core, and light propagating through the third core can be multiplexed/demultiplexed in the mode. Therefore, according to such a configuration, mode multiplexing/demultiplexing of a further larger amount of light can be performed.

In addition, $y_1$ and $z_1$ are preferably the same. Since light of the same LP mode propagates through the second core and the third core, light can be easily handled, and the multicore fiber can be produced in an easy manner.

In this case, $y_1$ and $z_1$ are preferably "1". In other words, it is preferable that both the second core and the third core are cores that propagate light of a single mode. By propagating light of the single mode, light propagating through the second and third cores can be easily handled.

In addition, the first core may be positioned at the center of a cladding.

In addition, it is preferable that the different-mode interaction section is formed as a part of the different-mode non-interaction section is stretched.

In this way, by forming the different-mode interaction section, the structure of the cross-section of the multicore fiber in the different-mode interaction section and the structure of the cross-section of the multicore fiber in the different-mode non-interaction section have a similarity. For this reason, the correlation between the propagation constant of light of the different-mode interaction section and the propagation constant of light of the different-mode non-interaction section can be easily calculated. In addition, since the different-mode interaction section is formed through a stretching process, the different-mode interaction section can be easily formed by stretching the multicore fiber by using a heater having low energy.

In addition, it is preferable that the number of LP modes of light propagating through each core in a used wavelength band is not changed between the different-mode interaction section and the different-mode non-interaction section.

Since the propagation constant is not changed in each section, unnecessary excitation of light of the LP mode does not need to be considered, and light can be efficiently handled.

As above, according to the present invention, a mode multiplexer/demultiplexer that can be decreased in size can be realized using a multicore fiber.

DESCRIPTION OF EMBODIMENTS

Hereinafter, multicore fibers according to preferred embodiments of the present invention will be described in detail with reference to the drawings. For the convenience of understanding, a scale illustrated in each drawing and a scale presented in the following description may be different from each other.

First Embodiment

Figure 1:
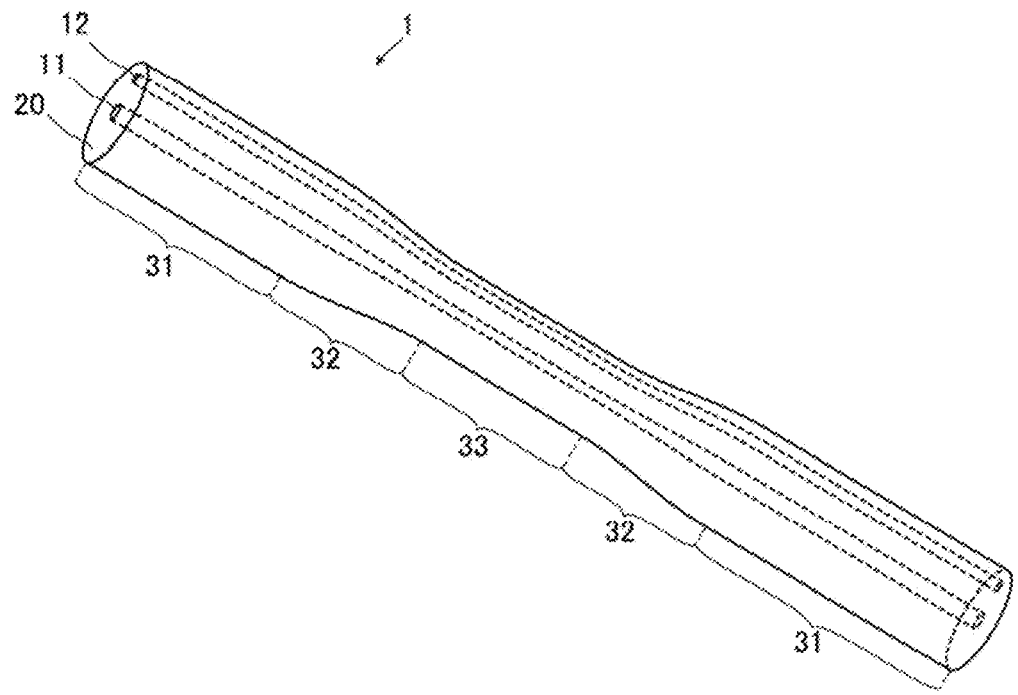
FIG. 1 is a diagram that illustrates a multicore fiber according to a first embodiment.

FIG. 1 is a diagram that illustrates a multicore fiber according to a first embodiment of the present invention. As illustrated in FIG. 1, the multicore fiber 1 according to this embodiment includes: a first core 11; a second core 12; and a cladding 20 that surrounds the outer circumferential face of the first core 11 and the outer circumferential face of the second core 12 without forming any gap.

In addition, in the multicore fiber 1, a large diameter portion 31, a tapered portion 32, and a small diameter portion 33 are formed along the longitudinal direction. The tapered portion 32 and the small diameter portion 33 are formed as a part of the large diameter portion 31 is heated and stretched. While the stretching using heating may be performed through a heating process using an oxyhydrogen burner, it may be sufficiently performed using heating through discharging. For example, while a fusion splicing device using arc discharging is practically used, such arc discharging may be used as a heating source for the stretching process.

Figure 2A:
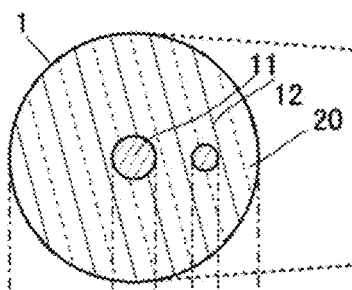
FIGS. 2A and 2B are diagrams that illustrate the appearances of cross-sections of a large diameter portion and a small diameter portion of the multicore fiber illustrated in FIG. 1 that are perpendicular to the longitudinal direction.
Figure 2A:
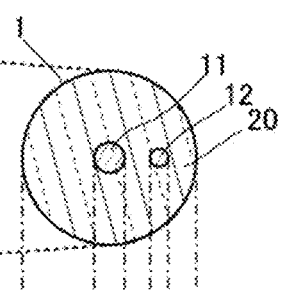
Figure 2B:
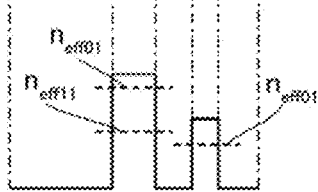
Figure 2B:
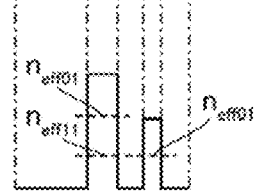

FIGS. 2A and 2B are diagrams that illustrate the appearances of cross-sections of a large diameter portion 31 and a small diameter portion 33 of the multicore fiber 1 that are perpendicular to the longitudinal direction. More specifically, FIG. 2A illustrates the appearances of the structures of the cross-sections of the large diameter portion 31 and the small diameter portion 33, and FIG. 2B illustrates the appearances of refractive index profiles of the cross-sections of the large diameter portion 31 and the small diameter portion 33.

As illustrated in FIG. 2A, the first core 11 is positioned at the center of the cladding 20, and the second core 12 is positioned on the periphery of the first core 11. As described above, since the small diameter portion 33 is formed by stretching the large diameter portion 31, a ratio among the outer diameter of the cladding 20, the diameter of the first core 11 and the diameter of the second core 12 does not change in any position of the multicore fiber 1. For this reason, the diameter of the first core 11 in the small diameter portion 33 is smaller than the diameter of the first core 11 in the large diameter portion 31, and the diameter of the second core 12 in the small diameter portion 33 is smaller than the diameter of the second core 12 in the large diameter portion 31.

In FIG. 2B, a solid line represents a refractive index profile of the multicore fiber 1. As illustrated in FIG. 2B, the refractive index of the first core 11 and the refractive index of the second core 12 are higher than the refractive index of the cladding 20 and are constant along the longitudinal direction. The first core 11 propagates light of up to a second-order LP mode. In other words, the first core 11 according to this embodiment is a few-mode core that propagates light of an LP01 mode and light of an LP11 mode and suppresses the propagation of light of an LP21 mode that is light of a third-order LP mode. In addition, the second core 12 propagates light of up to a first-order LP mode. In other words, the second core 12 according to this embodiment is a single mode core that propagates light of the LP01 mode and suppresses the propagation of light of the LP11 mode.

In addition, in FIG. 2B, a dashed line represents the effective refractive index $n_{eff}$ of light of each LP mode propagating through the first core 11 and the second core 12. In the large diameter portion 31, the propagation constant of light of each LP mode of the first core 11 and the propagation constant of light of each LP mode of the second core 12 do not coincide with each other. The propagation constant corresponds to the effective refractive index $n_{eff}$. Thus, in this embodiment, the effective refractive index $n_{eff01}$ of light of the first-order LP mode of the first core 11 of the large diameter portion 31 and the effective refractive index $n_{eff11}$ of light of the second-order LP mode do not coincide with the effective refractive index $n_{eff01}$ of light of the first-order LP mode of the second core 12. For this reason, in the large diameter portion 31, crosstalk between light of each LP mode propagating through the first core 11 and light of each LP mode propagating through the second core is suppressed. Accordingly, in the large diameter portion 31, an occurrence of multiplexing/demultiplexing between mutually-different modes is suppressed, and the large diameter portion 31 is a different-mode non-interaction section.

On the other hand, in the small diameter portion 33, as described above, the diameter of each core is different from the diameter of each core in the large diameter portion 31, and accordingly, the effective refractive index $n_{eff}$ is different from the effective refractive index $n_{eff}$ of the large diameter portion 31. In addition, in the small diameter portion 33, the effective refractive index $n_{eff11}$ of light of the second-order LP mode of the first core 11 and the effective refractive index $n_{eff01}$ of light of the first-order LP mode of the second core 12 coincide with each other. In other words, the propagation constant of light of the second-order LP mode of the first core 11 and the propagation constant of light of the first-order LP mode of the second core 12 coincide with each other. For this reason, in the small diameter portion 33, crosstalk between light of the second-order LP mode propagating through the first core 11 and light of the first-order LP mode propagating through the second core occurs. Accordingly, in the small diameter portion 33, mode multiplexing/demultiplexing between light of the second-order LP mode propagating through the first core 11 and light of the first-order LP mode propagating through the second core occurs. For this reason, the small diameter portion 33 is a different-mode interaction section.

The number of LP modes of light propagating through each core in a used wavelength band way be changed between the large diameter portion 31 and the small diameter portion 33. However, it is preferable that the number of LP modes is not changed therebetween. Accordingly, in this embodiment, in each of the large diameter portion 31 and the small diameter portion 33, it is preferable that the first core 11 propagates light of the first-order LP mode and light of the second-order LP mode and suppresses the propagation of light of the third LP mode, and the second core 12 propagates light of the first-order LP mode and suppresses the propagation of light of the second-order LP mode.

In order to cause the large diameter portion 31 to serve as a different-mode non-interaction section and cause the small diameter portion 33 to serve as a different-mode interaction section as described above, for example, the first core 11 and the second core 12 may be configured as below. In a case where the wavelength of used light is 1.55 μm, a relative refractive index difference of the first core 11 with respect to the cladding 20 is configured to be 0.55%, and a relative refractive index difference of the second core 12 with respect to the cladding 20 is configured to be 0.36%. In addition, in the large diameter portion 31, the radius of the first core 11 is configured to be 6.3 μm, and the radius of the second core 12 is configured to be 3.7 μm. Furthermore, a draw ratio between the large diameter portion 31 and the small diameter portion 33 is configured to be 1.4 In such a case, in a case where light having a wavelength of 1.55 μm propagates through the first core 11 and the second core 12, the number of LP modes of light propagating through each core is not changed between the large diameter portion 31 and the small diameter portion 33.

Here, the draw ratio is a similarity ratio between the small diameter portion 33 and the large diameter portion 31 and is a value that is the same as the diameter of the multicore fiber 1 in the large diameter portion 31 in a case where the diameter of the multicore fiber 1 in the small diameter portion 33 is set to "1".

In the multicore fiber 1 according to this embodiment, when light of a first-order LP mode is incident on the first, core 11 and the second core 12, in the small diameter portion 33, light of the first-order LP mode of the second core 12 is multiplexed into the first core 11 as light of a second-order LP mode. Alternatively, in a case where light formed by a first LP mode and a second LP mode is incident on the first core 11, and no light is incident on the second core 12, in the small diameter portion 33, light of the second-order LP mode of the first core 11 is demultiplexed into the second core 12 as light of a first-order LP mode. In this way, mode multiplexing/demultiplexing is achieved. However, in the large diameter portion 31, since the propagation constant of light of each LP mode of the first core 11 and the propagation constant of light of each LP mode of the second core 12 do not coincide with each other, the occurrence of multiplexing/demultiplexing is suppressed even in a structure not separating the first core 11 and the second core 12 from each other. Thus, according to the multicore fiber 1 of this embodiment, a mode multiplexer/demultiplexer of which the size can be decreased can be realized.

Second Embodiment

Next, a second embodiment of the present invention will be described. A same reference sign will be assigned to a constituent, element that is the same as or equivalent to that of the first embodiment, and duplicate description will not be presented except for the case of particular description.

Figure 3A:
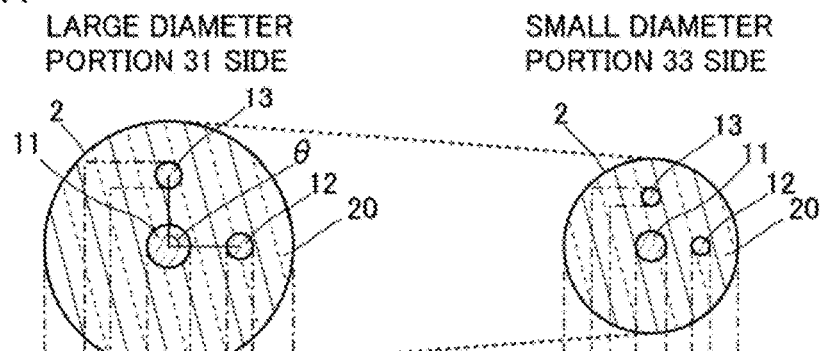
FIGS. 3A and 3B are diagrams that illustrate the appearances of cross-sections of a large diameter portion and a small diameter portion of a multicore fiber according to a second embodiment that is perpendicular to the longitudinal direction.
Figure 3B:
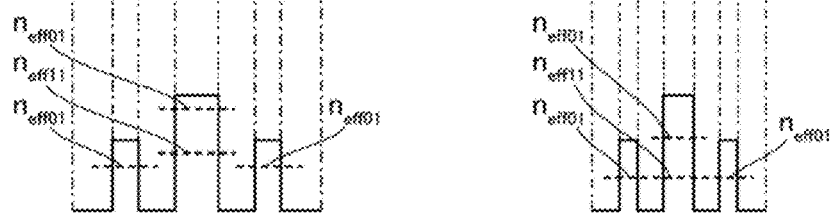

FIGS. 3A and 3B are diagrams that illustrate the appearances of cross-sections of a large diameter portion and a small diameter portion of a multicore fiber according to this embodiment that is perpendicular to the longitudinal direction. More specifically, FIG. 3A illustrates the appearances of the structures of the cross-sections of the large diameter portion 31 and the small diameter portion 33, and FIG. 3B illustrates the appearances of refractive index profiles of the cross-sections of the large diameter portion 31 and the small diameter portion 33.

The multicore fiber 2 according to this embodiment further includes a third core 13 arranged at a position different from the position of a second core 12 by 90 degrees using the center of a first core 11 as a reference, which is different from the multi core fiber 1 according to the first embodiment. In other words, an angle θ formed by a line binding the center of the first core 11 and the center of the second core 12 and a line binding the center of the first core 11 and the center of the third core 13 is configured to be 90 degrees.

The configuration of the third core 13 is similar to that of the second core 12 except for the arranged position. Thus, when light of a first-order LP mode is incident on the first core 11, the second core 12, and the third core 13, in the small diameter portion 33, light of the first-order LP mode of the second core 12 and the third core 13 is multiplexed into the first core 11 as light of a second-order LP mode. In addition, in a case where light formed by a first-order LP mode and a second-order LP mode is incident on the first core 11, and no light is incident on the second core 12 and the third core 13, in the small diameter portion 33, the light of the second-order LP mode of the first core 11 is demultiplexed into the second core 12 and the third core 13 as light of a first-order LP mode. In addition, in the large diameter portion 31, since the propagation constant of light of each LP mode of the first core 11 and the propagation constant of light of each LP mode of the second core 12 and the third core 13 do not coincide with each other, the occurrence of multiplexing/demultiplexing is suppressed among first core 11, the second core 12, and the third core 13.

Here, the multiplexing/demultiplexing of light of the second-order LP mode propagating through the first core 11 and light of the first-order LP mode propagating through the second core 12 and third core 13 will be described in more detail.

According to the light of the LP11 mode that is light of a second-order mode, when a straight line that passes through the center of a core through which the light propagates and grows in the diameter direction is used as a reference, a positive electric field is distributed on one side, a negative electric field is distributed on the other side, and a same energy distribution is formed on the one side and the other side. Accordingly, when the light of the LP11 mode is rotated by 180 degrees using the center of the core through which the light propagates as a reference, an energy distribution that is the same as that before rotation is formed. On the other hand, when the light is rotated by any other angle, an energy distribution different from that before rotation is formed. Even in a case where light of two LP11 modes having a 90°-rotated relation is multiplexed, the light of the LP11 mode is called as light of the LP11 mode as well.

Thus, one of the light of two LP11 modes having the 90°-rotated relation is set as light of the LP11a mode, and the other is set as light of the LP11b mode, and the light of the LP11 mode propagating through the first core 11 is a combination of the light of the LP11a mode and the light of the LP11b mode. A case where light of a second-order LP mode (LP11 mode) propagating through the first core 11 is mode-demultiplexed into light of first-order LP modes propagating through the second core 12 and the third core 13 will be considered. In such a case, the light of the LP11a mode tends to be demultiplexed into light of a first LP mode propagating through one of the second core 12 and the third core 13, and the light of the LP11b mode tends to be demultiplexed into light of a first LP mode propagating through the other of the second core 12 and the third core 13. In addition, a case will be considered in which light of the first LP mode propagating through the second core 12 and the third core 13 is mode-multiplexed into light of the LP11 mode of the first core 11. In such a case, the light propagating through the second core 12 tends to be multiplexed into one of light of the LP11a mode and light of the LP11b mode propagating through the first core 11, and the light propagating through the third core 13 tends to be multiplexed into the other of the light of the LP11a mode and the light of the LP11b mode propagating through the first core 11.

Thus, according to the multicore fiber of this embodiment, also in a case where the first core 11 propagates light of up to a second-order LP mode, information can be superimposed on light of the LP01 mode, light of the LP11a mode, and light of the LP11b mode, and accordingly, optical communication having a more information amount can be performed.

Third Embodiment

Next, a third embodiment of the present invention will be described. A same reference sign will be assigned to a constituent element that is the same as or equivalent to that of the first embodiment, and duplicate description will not be presented except for the case of particular description.

Figure 4A:
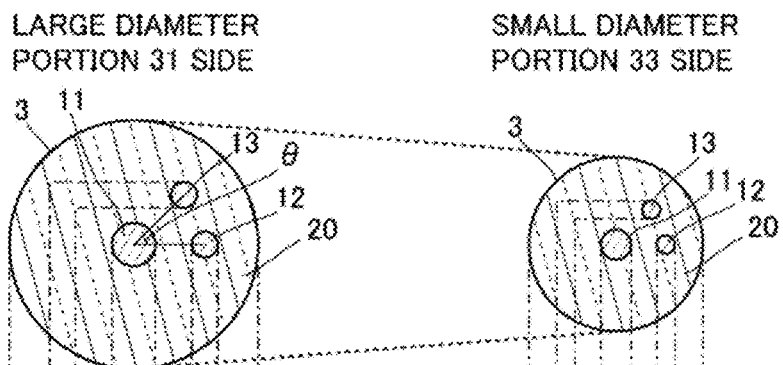
FIGS. 4A and 4B are diagrams that illustrate the appearance of a cross-section perpendicular to the longitudinal direction of a large diameter portion and a small diameter portion of a multicore fiber according to a third embodiment.
Figure 4B:
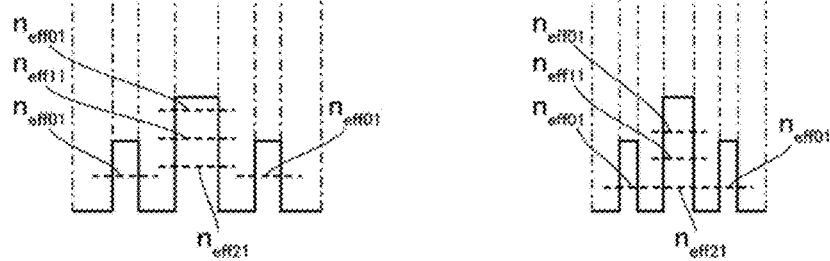

FIGS. 4A and 4B are diagrams that illustrate the appearances of cross-sections of a large diameter portion and a small diameter portion of a multicore fiber according to this embodiment that is perpendicular to the longitudinal direction. More specifically, FIG. 4A illustrates the appearances of the structures of the cross-sections of the large diameter portion 31 and the small diameter portion 33, and FIG. 4B illustrates the appearances of refractive index profiles of the cross-sections of the large diameter portion 31 and the small diameter portion 33.

A first core 11 according to this embodiment propagates light of up to a third-order LP mode. In other words, the first core 11 according to this embodiment is a few-mode core that propagates light of an LP01 mode, light of an LP11 mode, and light of an LP21 mode and suppresses the propagation or light of an LP02 mode that is light of a fourth-order LP mode.

In addition, a second core 12 propagates light of up to a first-order LP mode. In this embodiment, different from the multicore fiber 1 according to the first embodiment, in the small diameter portion 33, the propagation constant of light of the first LP mode of the second core 12 coincides with the propagation constant of light of the third-order LP mode of the first core 11. In other words, in the small diameter portion 33, the effective refractive index $n_{\mathit{eff}01}$ of light of the first-order LP mode of the second core 12 coincides with the effective refractive index $n_{\mathit{eff}01}$ of light of the third-order LP mode of the first core 11. In addition, in the large diameter portion 31, the propagation constant of light of each LP mode of the first core 11 and the propagation constant of light of each LP mode of the third core 13 are configured not to coincide with each other.

In addition, the multicore fiber 3 according to this embodiment further includes a third core 13 arranged at a position different from that of the second core 12 by 45 degrees using the center of the first core 11 as a reference. In other words, an angle θ formed by a line binding the center of the first core 11 and the center of the second core 12 and a line binding the center of the first core 11 and the center of the third core 13 is configured to be 45 degrees. The configuration of the third core 13 is similar to that of the second core 12 except for the arranged position. Thus, when light of a first-order LP mode is incident on the first core 11, the second core 12, and the third core 13, in the small diameter portion 33, light of the first-order LP mode of the second core 12 and the third core 13 is multiplexed into the first core 11 as light of a third-order LP mode. In addition, in a case where light formed by a first-order LP mode, a second-order LP mode, and a third-order LP mode is incident on the first core 11, and no light is incident on the second core 12 and the third core 13, in the small diameter portion 33, the light of the third-order LP mode of the first core 11 is demultiplexed into the second core 12 and the third core 13 as light of a first-order LP mode. In addition, in the large diameter portion 31, since the propagation constant of light of each LP mode of the first core 11 and the propagation constant of light of each LP mode of the second core 12 and the third core 13 do not coincide with each other, the occurrence of multiplexing/demultiplexing is suppressed among first core 11, the second core 12, and the third core 13.

Also in this embodiment, it is preferable that the number of LP modes of light propagating through each core is not changed between the large diameter portion 31 and the small diameter portion 33.

Here, the multiplexing/demultiplexing of light of the third-order LP mode propagating through the first core 11 and light of the first-order LP mode propagating through the second core 12 and third core 13 will be described in more detail.

According to the light of the LP21 mode that is light of a third-order mode, among four areas partitioned by two straight lines, which are perpendicular to each other, passing through the center of a core through which the light propagates and growing in the diameter direction, the distributions of electric fields in the areas adjacent to each other are in a state in which the polarity is reversed, and a same energy distribution is formed in the areas. Accordingly, when the light of the LP21 mode is rotated by 90 degrees using the center of the core through which the light propagates as a reference, an energy distribution that is the same as that before rotation as formed. On the other hand, when the light is rotated by any other angle, an energy distribution different from that before rotation is formed. Even in a case where light of two LP21 modes having a relation of 45+90n degrees rotation (here, n is an integer of "0" or more) such as 45 degrees or 135 degrees is multiplexed, the light of the LP21 mode is called as light of the LP21 mode as well.

Thus, for example, one of the light of two LP21 modes having the 45°-rotated relation is set as light of the LP21a mode, and the other is set as light of the LP21b mode, and the light of the LP21 mode propagating through the first core 11 is a combination of the light of the LP21a mode and the light of the LP21b mode. A case where light of a third-order LP mode (LP21 mode) propagating through the first core 11 is mode-demultiplexed into light of first-order LP modes propagating through the second core 12 and the third core 13 will be considered. In such a case, the light of the LP21a mode tends to be superimposed on light, of a first LP mode propagating through one of the second core 12 and the third core 13, and the light of the LP21b mode tends to be demultiplexed into light of a first LP mode propagating through the other of the second core 12 and the third core 13. In addition, a case will be considered in which light of the first LP mode propagating through the second core 12 and the third core 13 is mode-multiplexed into light of the LP21 mode of the first core 11. In such a case, the light propagating through the second core 12 tends to be multiplexed into one of light of the LP21a mode and light of the LP21b mode propagating through the first core 11, and the light propagating through the third core 13 tends to be multiplexed into the other of the light of the LP21a mode and the light of the LP21b mode propagating through the first core 11.

Thus, according to the multicore fiber of this embodiment, also in a case where the first core 11 propagates light of up to a third-order LP mode, information can be superimposed on light of the LP01 mode, light of the LP21a mode, and light of the LP21b mode, and accordingly, optical communication having a more information amount can be performed.

Fourth Embodiment

Next, a fourth embodiment of the present invention will be described. A same reference sign will be assigned to a constituent element that is the same as or equivalent to that of the first embodiment, and duplicate description will not be presented except for the case of particular description.

Figure 5A:
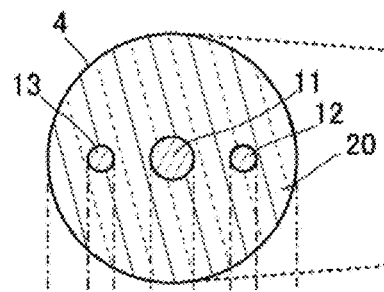
FIGS. 5A and 5B are diagrams that illustrate the appearance of a cross-section perpendicular to the longitudinal direction of a large diameter portion and a small diameter portion of a multicore fiber according to a fourth embodiment.
Figure 5A:
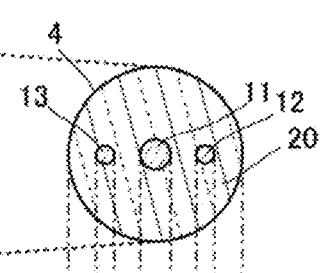
Figure 5B:
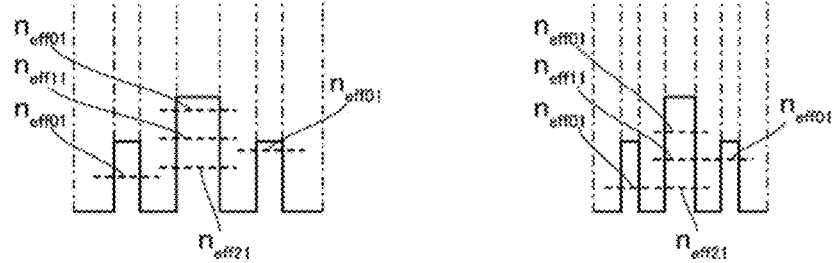

FIGS. 5A and 5B are diagrams that illustrate the appearances of cross-sections of a large diameter portion and a small diameter portion of a multicore fiber according to this embodiment that is perpendicular to the longitudinal direction. More specifically, FIG. 3A illustrates the appearances of the structures of the cross-sections of the large diameter portion 31 and the small diameter portion 33, and FIG. 3B illustrates the appearances of refractive index profiles of the cross-sections of the large diameter portion 31 and the small diameter portion 33.

A first core 11 according to this embodiment has a configuration similar to that of the first core 11 according to the third embodiment and propagates light of up to a third-order LP mode.

In addition, the multicore fiber 4 includes a third core 13 on a side opposite to the side of the second core 12 by using the center of the first core 11 as a reference. The third core 13 propagates light of up to a first LP mode. The configuration of the third core 13 is similar to the third core 13 according to the third embodiment except for the arranged position. Accordingly, in the small diameter portion 33, the propagation constant of light of the first LP mode of the third core 13 coincides with the propagation constant of light of the third-order LP mode of the first core 11, In other words, in the small diameter portion 33, the effective refractive index $n_{eff01}$ of light of the first-order LP mode of the third core 13 coincides with the effective refractive index of light of the third-order LP mode of the first core 11. In addition, in the large diameter portion 31, the propagation constant of light of each LP mode of the first core 11 and the propagation constant of light of each LP mode of the third core 13 are configured not to coincide with each other.

In the multicore fiber 4 having such a configuration, when light of a first-order LP mode is incident on the first core 11, the second core 12, and the third core 13, in the small diameter portion 33, light of the first-order LP mode of the second core 12 is multiplexed into the first core 11 as light of a second-order LP mode, and the light of the first LP mode of the third core 13 is multiplexed into the first core 11 as light of a third-order LP mode. In addition, in a case where light formed by a first-order LP mode, a second-order LP mode, and a third-order LP mode is incident on the first core 11, and no light is incident on the second core 12 and the third core 13, in the small diameter portion 33, the light, of the second-order LP mode of the first core 11 is demultiplexed into the second core 12 as light of a first-order LP mode, and the light of the third-order LP mode of the first core 11 is demultiplexed into the third core 13 as light of a first-order LP mode. In addition, in the large diameter portion 31, since the propagation constant of light of each LP mode of the first core 11 and the propagation constant of light of each LP mode of the second core 12 and the third core 13 do not coincide with each other, the occurrence of multiplexing/demultiplexing is suppressed among first core 11, the second core 12, and the third core 13.

Also in this embodiment, it is preferable that the number of LP modes of light propagating through each core is not changed between the large diameter portion 31 and the small diameter portion 33.

According to the multicore fiber 4 of this embodiment, in the small diameter portion 33, light of the second-order LP mode propagating through the first core 11 and light of the first-order LP mode propagating through the second core 12 can be multiplexed/demultiplexed, and light of the third-order LP mode propagating through the first core 11 and light of the first-order LP mode propagating through the third core 13 can be multiplexed/demultiplexed, and accordingly, mode multiplexing/demultiplexing of a larger amount light can be performed.

As above, while the above-described embodiments of the present invention have been described as examples, the present invention is not limited thereto.

In the first embodiment, the multicore fiber 1 that performs mode multiplexing/demultiplexing of light of the second-order LP mode propagating through the first core 11 and light of the first-order LP mode propagating through the second core 12 has been described as an example. However, a combination of modes to be multiplexed/demultiplexed may be different between light propagating through the first core 11 and light propagating through the second core. For example, it may be configured such that the first core 11 propagates light of up to the third-order LP mode, the second core 12 propagates light of up to the second-order LP mode, and light of the third-order LP mode propagating through the first core 11 is multiplexed/demultiplexed in the mode with light of the first-order LP mode or light of the second-order LP mode propagating through the second core. When this is described without specifying the order of LP modes, the first core 11 is a core that propagates light of at least up to an x-th order LP mode (here, x is an integer of "2" or more), the second core 12 is a core that propagates light of at least up to a y-th order LP mode (here, y is an integer of "1" or more), and the propagation constant of light of an $x_1$-th order LP mode of the first core 11 (here, $x_1$ is an integer of "1" or more and x or less) and the propagation constant of light of a $y_1$-th order LP mode of the second core 12 (here, $y_1$ is an integer of "1" or more and y or less other than $x_1$) coincide with each other. However, as in this embodiment, in a case where the first core 11 propagates light of the first-order LP mode and light of the second-order LP mode, and the second core 12 propagates light of up to the first-order LP mode, a combination of light of LP modes of lowest order is formed, and accordingly, light can be easily handled.

In addition, in the second embodiment, the third core 13 is arranged at a position different from the position of the second core 12 by 90 degrees using the center of the first core 11 as a reference, and, in the small diameter portion 33, light propagating through the first core that is multiplexed/demultiplexed in the mode with light propagating through the second core 12 and the third core 13 is configured to be light acquired by adding two units of light (light of the LP11a mode and light of the LP11b mode) of a same LP mode, which have mutually-different energy distributions in the case of being rotated to be different from each other by 90 degrees using the center of the first core 11 as a reference, in a state being rotated to be different from, each other by 90 degrees using the center of the first core 11 as a reference. Furthermore, in the third embodiment, the third core 13 is arranged at a position different from the position of the second core 12 by 45 degrees using the center of the first core 11 as a reference, and, in the small diameter portion 33, light propagating through the first core that is multiplexed/demultiplexed in the mode with light propagating through the second core 12 and the third core 13 is configured to be light acquired by adding two units of light (light of the LP21a mode and light of the LP21b mode) of a same LP mode, which have mutually-different energy distributions in the case of being rotated to be different from each other by 45 degrees using the center of the first core 11 as a reference, in a state being rotated to be different from each other by 45 degrees using the center of the first core 11 as a reference.

However, in a case where the light propagating through the first core 11 is light of a different LP mode, the angle formed by the second core 12 and the third core 13 using the center of the first core 11 as a reference may be different. In addition, the light propagating through the second core 12 and the third core 13 to be multiplexed/demultiplexed in the mode with light propagating through the first core 11 is not limited to light of the first-order LP mode. For example, in the third embodiment, light propagating through the second core 12 and the third core 13 that is multiplexed/demultiplexed in the mode with light of the third-order mode propagating through the first core 11 may be light of the second-order LP mode.

Thus, the first core 11, the second core 12, and the third core 13 can be generalized as below. The first core 11 propagates light of up to an x-th order LP mode (here, x is an integer of "2" or more), and the second core 12 and the third core 13 respectively propagate light of up to a y-th order LP mode (here, y is an integer of "1" or more) and are arranged at mutually-different positions by a predetermined angle using the center of the first core 11 as a reference. In the small diameter portion 33, the propagation constant of light of the $x_1$-th order LP mode of the first core 11 (here, $x_1$ is an integer of "1" or more and x or less) and the propagation constant of light of a $y_1$-th order LP mode of the second core 12 and the third core (here, $y_1$ is an integer of "1" or more and "y" or less other than $x_1$) coincide with each other. The light of the $x_1$-th order LP mode is configured to be light acquired by adding two units of light of a same LP mode, which have mutually-different energy distributions in the case of being rotated to be different from each other by the predetermined angle formed by the second core 12 and the third core 13 using the center of the first core 11 as a reference, in the state of being rotated to be different from each other by the predetermined angle formed by the second core 12 and the third core 13 using the center of the first core 11 as a reference. In addition, in the large diameter portion 31, the propagation constant of light of each LP mode of the first core 11 and the propagation constant of light of each LP mode of the second core 12 and the third core 13 are configured not to coincide with each other. From such a definition, the second embodiment is an example in which x is "2", y is "1", $x_1$ is "2", $y_1$ is "1", and the predetermined angle is 90 degrees. In addition, the third embodiment is an example in which x is "3", y is "1", $x_1$ is "3", $y_1$ is "1", and the predetermined angle is 45 degrees.

In addition, in the third embodiment, light of the third LP mode propagating through the first core 11 is multiplexed/demultiplexed in the mode with light of the first-order LP mode propagating through the second core 12 and the third core 13. However, the light propagating through the second core 12 and the third core 13 that is multiplexed/demultiplexed in the mode with the light propagating through the first core does not need to be in the same LP mode between the second core 12 and the third core 13. For example, as a modified example of the third embodiment, a multicore fiber as below may be provided. In the multicore fiber of this modified example, while a first core 11, a second core 12, and a third core 13 are arranged as in the third embodiment, the third core 13 propagates light of up to a second-order LP mode. Then, light of a third-order LP mode propagating through the first core 11 is multiplexed/demultiplexed in the mode with light of a first-order LP mode propagating through the second core 12 and is multiplexed/demultiplexed with light of a second-order LP mode propagating through the third core 13.

Thus, the first core 11, the second core 12, and the third core 13 can be generalized as below so as to include the modified example of the third embodiment described above. The first core 11 propagates light of up to an x-th order LP mode (here, x is an integer of "2" or more), the second core 12 propagates light of up to a y-th order LP mode (here, y is an integer of "1" or more), the third core 13 propagates light of up to a z-th order LP mode (here, z is an integer of "1" or more), and the second core 12 and the third core 13 are arranged at positions different from each other by a predetermined angle using the center of the first core 11 as a reference. In the small diameter portion 33, the propagation constant of light of the $x_1$-th order LP mode of the first core 11 (here, is an integer of "1" or more and x or less) and the propagation constant of light of a $y_1$-th order LP mode of the second core 12 (here, $y_1$ is an integer of "1" or more and "y" or less other than $x_1$), and the propagation constant of light of the $x_1$-th order LP mode of the first core 11 (here, $x_1$ is an integer of "1" or more and x or less) and the propagation constant of light of a $z_1$-th order LP mode of the third core 13 (here, $z_1$ is an integer of "1" or more and z or less other than $x_1$ and $y_1$) coincide with each other. The light of the x-th order LP mode is configured to be light acquired by adding two units of light of a same LP mode, which have mutually-different energy distributions in the case of being rotated to be different from each other by the predetermined angle formed by the second core 12 and the third core 13 using the center of the first core 11 as a reference, in the state of being rotated to be different from each other by the predetermined angle using the center of the first core 11 as a reference. In addition, in the large diameter portion 31, the propagation constant of light of each LP mode of the first core 11 and the propagation constant of light of each LP mode of the second core 12 and the third core 13 are configured not to coincide with each other. From such a definition, the modified example of the third embodiment is an example in which x is "3", y is "1", z is "2", $x_1$ is "3", $y_1$ is "1", $z_1$ is "2", and the predetermined angle is 45 degrees. In addition, in such a generalized state, in a case where z and $y_1$ may be the same so as to include the examples of the second embodiment and the third embodiment. In other words, in a case where x and $x_1$ are "2", y, z, $y_1$, and are "1", and the predetermined angle is 90 degrees, the example of the second embodiment is represented. In addition, in a case where x and $x_1$ are "3", y, z, $y_1$, and $z_1$ are "1", and the predetermined angle is 45 degrees, the example of the third embodiment is represented.

In addition, in the fourth embodiment, light of the second-order LP mode propagating through the first core 11 is multiplexed/demultiplexed in the mode with light of the first-order LP mode propagating through the second core 12, and light of the third-order LP mode propagating through the first core 11 is multiplexed/demultiplexed in the mode with light of the first-order LP mode propagating through the third core 13. However, the light propagating through the second core 12 and the third core 13 that is multiplexed/demultiplexed in the mode with the light propagating through the first core 11 does not need to be in a same LP mode between the second core 12 and the third core 13. For example, as a modified example of the fourth embodiment, a multicore fiber as below may be provided. In this multicore fiber, the third core 13 propagates light of up to the second-order LP mode, which is different from the multicore fiber 4 according to the fourth embodiment. Then, light of the second-order LP mode propagating through the first core 11 is multiplexed/demultiplexed in the mode with light of the first-order LP mode propagating through the second core 12, and light of the third-order LP mode propagating through the first core 11 is multiplexed/demultiplexed in the mode with light of the second-order LP mode propagating through the third core 13.

Thus, the first core 11, the second core 12, and the third core 13 can be generalized as below so as to include the fourth embodiment described above. The first core 11 fourth embodiment described above. The first core 11 propagates light of up to an x-th order LP mode the an integer of "3" or more), the second core 12 propagates light of up to a y-th order LP mode (here, y is an integer of "1" or more), and the third core 13 propagates light of up to a z-th order LP mode (here, z is an integer of "1" or more). In the small diameter portion 33, the propagation constant of light of the x1-th order LP mode of the first core 11 (here, $x_1$ is an integer of "1" or more and x or less) and the propagation constant of light of a $y_1$-th order LP mode of the second core 12 (here, $y_1$ is an integer of "1" or more and "y" or less other than $x_1$) coincide with each other, and the propagation constant of light of the $x_2$-th order LP mode of the first core 11 (here, $x_2$ is an integer of "1" or more and x or less other than $x_1$) and the propagation constant of light of a $z_1$-th order LP mode of the third core 13 (here, $z_1$ is an integer of "1" or more and z or less other than $x_1$ and $x_2$) coincide with each other. In addition, in the large diameter portion 31, the propagation constant of light of each LP mode of the first core 11 and the propagation constant of light of each LP mode of the second core 12 and the third core 13 are configured not to coincide with each other. From such a definition, the fourth embodiment is an example in which x is "3", y and z are "1", $x_1$ is "2", $x_2$ is "3", $y_1$ and $z_1$ are "1". In addition, the modified example of the fourth embodiment described above is an example in which x is "3", y is "1", z is "2", $x_1$ is "2", $x_2$ is "3", $y_1$ is "1", and $z_1$ "2".

Furthermore, the first to fourth embodiments and the generalized examples as described above may be combined together.

Figure 6:
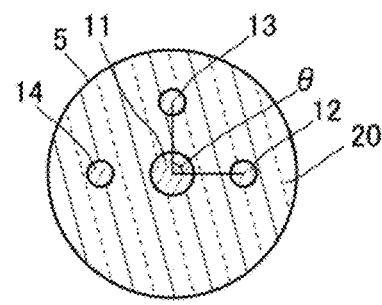
FIG. 6 is a diagram that illustrates a multicore fiber performing mode multiplexing/demultiplexing light of a plurality of second-order LP modes and light of a first-order LP mode and performs mode multiplexing/demultiplexing of light of a third-order LP mode and light of a first-order LP mode.

FIG. 6 is a diagram that illustrates a multicore fiber performing mode multiplexing/demultiplexing of light of a plurality of second-order LP modes and light of a first-order LP mode and mode multiplexing/demultiplexing of light of a third-order LP mode and light of a first-order LP mode. In describing this example, a same reference sign will be assigned to a constituent element that is the same as or equivalent to that of the second embodiment, and duplicate description will not be presented except for the case of particular description.

As illustrated in FIG. 6, the multicore fiber 5 of this example further includes a fourth core 14 having the same configuration as the second core 12 of the multicore fiber 3 according to the third embodiment at a position that is symmetrical to the position of the second core 12 with respect to the first core 11 as a reference. In addition, the first core 11 is configured to propagate light of up to a third-order LP mode. Furthermore, light of the second-order LP mode propagating through the first core 11 is similar to that according to the second embodiment.

Accordingly, the multicore fiber 5 of this example, in the small diameter portion 33, performs mode multiplexing/demultiplexing of two units of light (light of the LP11a mode and light of the LP11b mode) of the second-order LP mode propagating through the first core 11 and light ox the first-order LP mode propagating through the second core 12 and the third core 13 and performs mode multiplexing/demultiplexing of light of the third-order LP mode propagating through the first core 11 and light of the first-order LP mode propagating through the fourth core 14.

Figure 7:
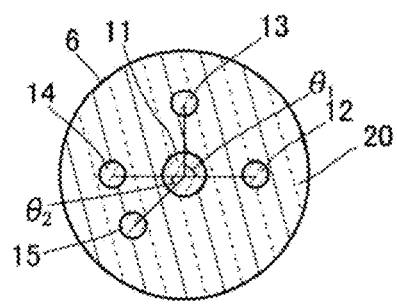
FIG. 7 is a diagram that illustrates a multicore fiber performing mode multiplexing/demultiplexing of light of a plurality of second-order LP modes and light of a first-order LP mode and performs mode multiplexing/demultiplexing light of a plurality of third-order LP modes and light of a first-order LP mode.

FIG. 7 is a diagram that illustrates a multicore fiber performing mode multiplexing/demultiplexing of light of a plurality of second-order LP modes, light of a first-order LP mode, light of a plurality of third-order LP modes, and light of a first-order LP mode. In describing this example, a same reference sign will be assigned to a constituent element that is the same as or equivalent to that of the example illustrated in FIG. 6, and duplicate description will not be presented except for the case of particular description.

As illustrated in FIG. 7, the multicore fiber 6 of this example further includes a fifth core 15 having the same configuration as that of the third core 13 of the multicore fiber 3 according to the third embodiment at a position forming 45 degrees with the fourth core 14 using the first core 11 as a reference. In addition, $\theta_1$ illustrated in FIG. 7 has the same meaning as $\theta$ illustrated in FIGS. 3A and 3B and is 90 degrees, and $\theta_2$ illustrated in FIG. 7 has the same meaning as $\theta$ illustrated in FIGS. 4A and 4B and is 45 degrees. Furthermore, light of the third-order LP mode propagating through the first core 11 is similar to that of the third embodiment.

Accordingly, the multicore fiber 6 of this example, in the small diameter portion 33, performs mode multiplexing/demultiplexing of two units of light of the second-order LP mode propagating through the first core 11 and light of the first-order LP mode propagating through the second core 12 and the third core 13 and performs mode multiplexing/demultiplexing of two units of light (light of an LP21a mode and light of an LP21b mode) of the third-order LP mode propagating through the first core 11 and light of the first-order LP mode propagating through the fourth core 14 and the fifth core 15.

In the example described above, while the first core 11 is positioned at the center of the cladding 20, the first core 11 may not be positioned at the center of the cladding.

EXAMPLE

Hereinafter, while examples of the present invention and comparative examples will be described more specifically, the present invention is not limited to the following examples.

Example 1

Figure 8:
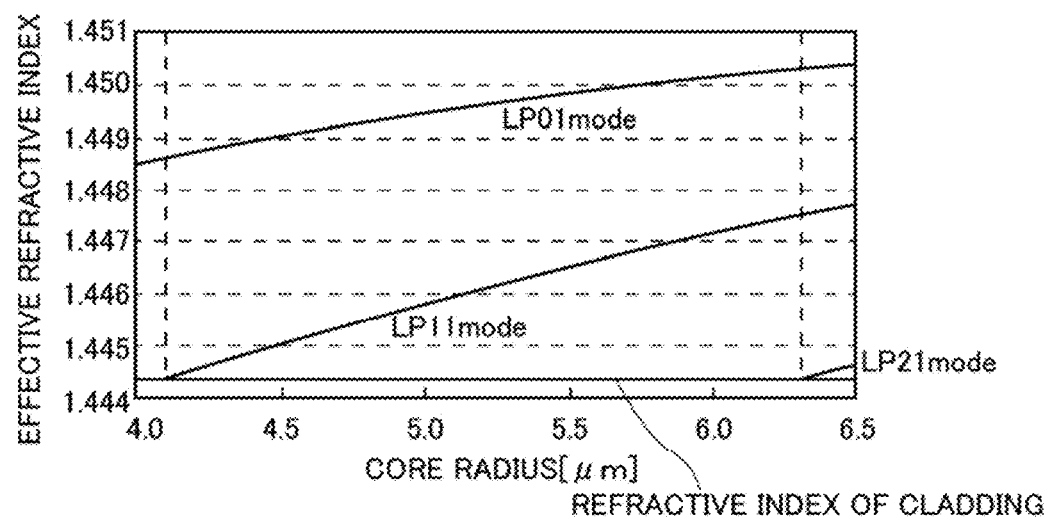
FIG. 8 is a diagram that illustrates a relation between the radius of a core and the effective refractive index in Example 1 for light having a relative refractive index difference of 0.55% and a wavelength of 1550 nm that is of light of a first-order LP mode, light of a second-order LP mode, and light of a third-order LP mode.
Figure 9:
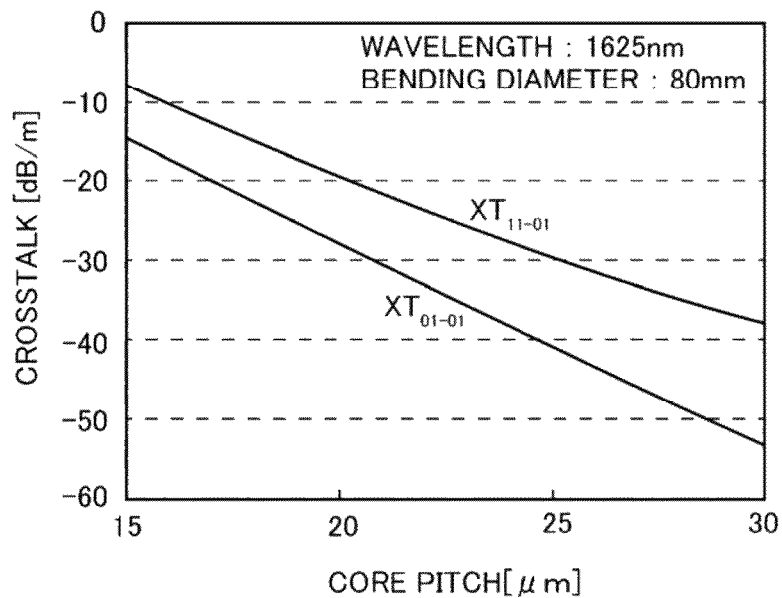
FIG. 9 is a diagram that illustrates a relation between inter-core crosstalk and an core pitch for light of an LP01 mode and light of an LP11 mode and a relation between inter-core crosstalk and an core pitch for light of the LP01 mode and light of the LP01 mode in Example 1.

In this example, the multicore fiber 1 according to the first embodiment was produced, and it was checked whether mode multiplexing/demultiplexing could be performed using the produced multicore fiber 1.
<Design of Multicore Fiber>
In the multicore fiber 1 according to the first embodiment, for a C band (a wavelength of 1530 nm to 1565 nm), design criteria for multiplexing/demultiplexing light of the LP01 mode and light of the LP11 mode and, for an L band (a wavelength of 1565 nm to 1625 nm), design criteria for multiplexing/demultiplexing light of the LP01 mode and light of the LP11 mode are acquired.
(Design of First Core)
As presented in the description of the first embodiment, the first core 11 propagates light of up to the second-order LP mode but does not propagate light of the third or higher order LP mode. FIG. 8 is a diagram that illustrates a relation between the radius of a core and an effective refractive index when the wavelength is 1550 nm for light of the first-order LP mode, light of the second-order LP mode, and light of the third-order LP mode. This diagram illustrates a case where the first core 11 has a step-type refractive index profile having a relative refractive index difference of 0.55%. As illustrated in FIG. 8, in a case where the radius of the core is in the range of 4.1 μm to 6.3 μm, it has been disclosed that light of up to the second-order LP mode is propagated, but light of the third or higher order LP mode is not propagated. Thus, considering that the diameter of the first core 11 is smaller in the small diameter portion than in the large diameter portion, it is preferable that the diameter of the core in the large diameter portion is large as possibly as can. Thus, the radius of the first core 11 in the large diameter portion was configured to be 6.3 μm. In addition, a relative refractive index difference $\Delta_{11}$ of the first core 11 with respect to the cladding 20 is configured to be 0.55% such that the effective area $A_{eff}$ of the LP01 mode of the first core 11 is 100 μm$^2$ for a wavelength of 1550 nm.
(Design of Second Core)
The effective area $A_{eff}$ of a general single mode fiber for a wavelength of 1550 nm is 80 μm$^2$, and thus, the effective area $A_{eff}$ the second core 12 was formed in the same level. Thus, the relative refractive index difference $\Delta_{12}$ of the second core 12 with, respect to the cladding was configured to be 0.36%. In addition, the radius of the second core 12 was configured to be 3.7 μm.
(Design of Inter-Core Pitch)
FIG. 9 is a diagram that illustrates a relation between inter-core crosstalk XT01-11, which is crosstalk between light of the LP01 mode and light of the LP11 mode, and an core pitch (pitch between centers of cores) and a relation between inter-core crosstalk $XT_{01\text{-}01}$, which is crosstalk between light of the LP01 mode and light of the LP01 mode, and art core pitch when the bending diameter of the multi-core fiber is 80 mm, and the wavelength is 1625 nm.

Figure 10:
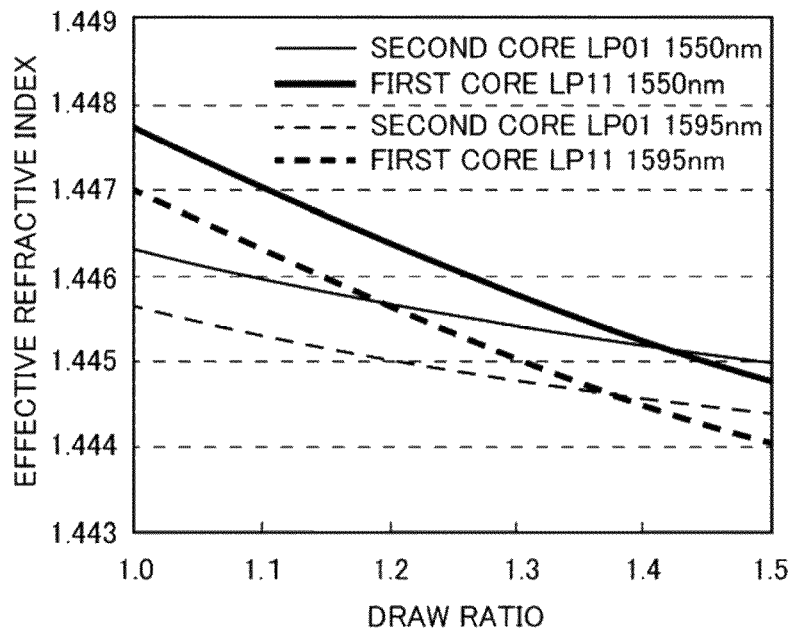
FIG. 10 is a diagram that illustrates a relation between a draw ratio and an effective refractive index for light of the LP11 mode, which propagates through a first core, and light of the LP01 mode, which propagates through a second core, each having a wavelength of 1550 nm and a wavelength of 1595 nm in Example 1.
Figure 11:
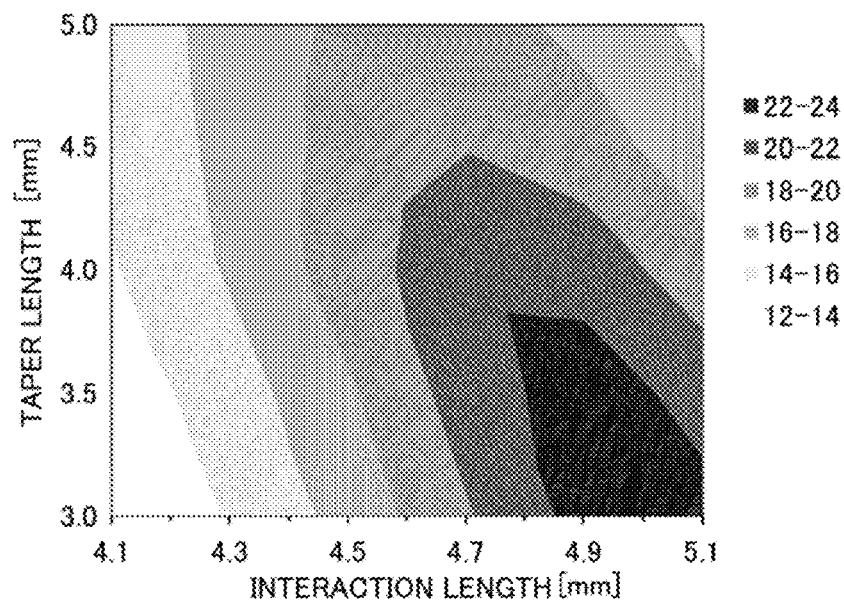
FIG. 11 is a diagram, that illustrates the state of a selection ratio of light having a wavelength of 1550 nm for a draw ratio of 1.42 in Example 1.
Figure 12:
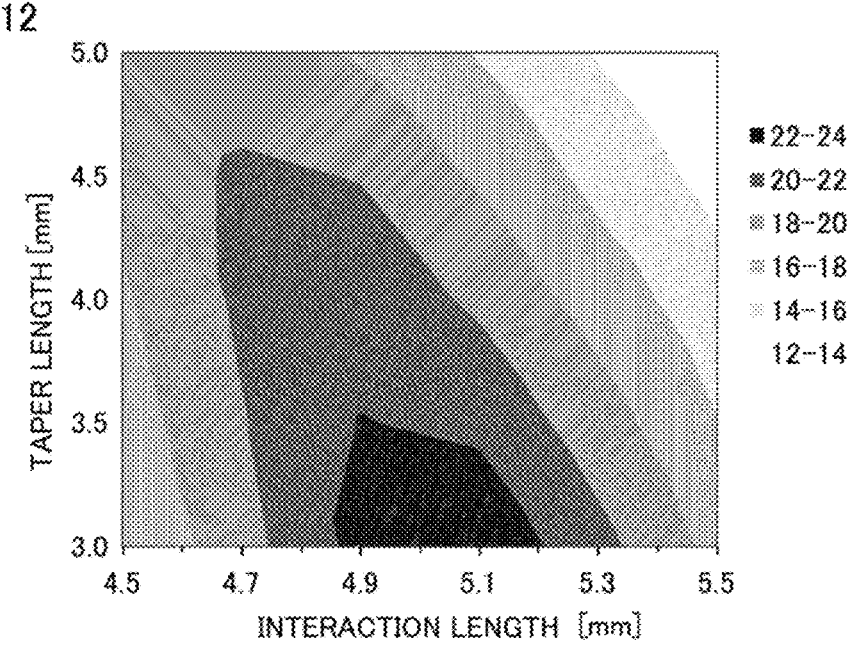
FIG. 12 is a diagram that illustrates the state of a selection ratio light having a wavelength of 1595 nm for a draw ratio of 1.38 in Example 1.

As described above, since the first core 11 propagates light of up to the second-order LP mode, and the second core 12 propagates light of the first-order LP mode, it is necessary to evaluate crosstalk XT01-11 and $XT_{01\text{-}01}$ in the large diameter portion. Based on FIG. 9, the crosstalk XT01-11 is higher crosstalk, and thus, this crosstalk may be reviewed. In addition, considering that the selection ratio of a general mode multiplexer/demultiplexer is about 25 dB, and the use length of this device is 1 m or less, crosstalk, of −30 dB/m was assumed to be secured. Thus, an core pitch between the first core 11 and the second core 12 in the large diameter portion was configured to be 25 μm.
(Design of Draw Ratio)
FIG. 10 is a diagram that illustrates a relation between a draw ratio and a effective refractive index for light of the LP11 mode propagating through the first core 11 and light of the LP01 mode propagating through the second core 12 having wavelengths of 1550 nm and 1595 nm. Here, 1550 nm is the center wavelength of the C band, and 1595 nm is the center wavelength of the L band. As illustrated in FIG. 10, for the wavelength of 1550 nm, at a draw ratio of 1.42, the effective refractive index of light of the LP01 mode and the effective refractive index of light of the LP11 mode have the same value. For the wavelength of 1595 nm, at a draw ratio of 1.38, the effective refractive index of light of the LP01 mode and the effective refractive index of light of the LP11 mode have the same value. Thus, for the multicore fiber for the C band, the draw ratio was configured to be 1.42, and, for the multicore fiber for the L band, the draw ratio was configured to be 1.38.
(Design of Tapered Portion)
FIG. 11 is a diagram that illustrates the state of a selection ratio of light having a wavelength of 1550 nm for a draw ratio of 1.42, and FIG. 12 is a diagram that illustrates the state of a selection ratio of light having a wavelength of 1595 nm for a draw ratio of 1.38. In FIGS. 11 and 12, the states of the selection ratio according to the length of the small diameter portion and the length of the tapered portion are illustrated. The selection ratio described here represents a ratio between the power level of light of the LP11 mode emitting from the first core 11 and the power level of light of the LP01 mode emitting from the second core 12 in a case where the light of the LP01 mode is incident on the second core 12 of the multicore fiber 1. By evaluating this selection ratio, the degree of the occurrence of mode multiplexing/demultiplexing can be acquired. As illustrated in FIG. 11, since the length of the tapered portion is in the range of 3.0 to 3.8 mm, and the length of the small diameter portion is in the range of 4.8 mm to 5.0 mm, it can be understood that a selection ratio of about 25 dB can be realized. In addition, as illustrated in FIG. 12, since the length of the tapered portion is in the range of 3.0 to 3.7 mm, and the length of the small diameter portion is in the range of 4.8 mm to 5.1 mm, it can be understood that a selection ratio of about 25 dB can be realized. A high selection ratio is preferable but does not need to be up to 25 dB, for the multicore fiber for the C band, the length of the tapered portion was configured to be 4.0 mm, and the length of the small diameter portion was configured to be 4.7 mm. In addition, for the multicore fiber for the L band, the length of the tapered portion was configured to be 4.0 mm, and the length of the small diameter portion was configured to be 4.9 mm. At this time, the selection ratio in each multicore fiber was about 22 dB.

<Generation and Evaluation of Multicore Fiber>

Next, based on the design determined as above, a multicore fiber that was formed only from a large diameter portion in which a tapered portion and a small diameter portion were not formed was generated. In this multicore fiber, the core pitch was 25.6 μm. In addition, for light having a wavelength of 1625 nm, the crosstalk $X_{01\text{-}01}$ was −43.4 dB/m, and the crosstalk $X_{11\text{-}01}$ was −32.4 dB/m, and accordingly, a result not degraded from the crosstalk of the designed value was acquired.

In addition, the mode field diameter MFD and the effective area $A_{eff}$ of each of the first core 11 and the second core 12 were checked for light of the LP01 mode having wavelengths of 1550 nm and 1625 nm. In addition, for light of the LP01 mode having wavelengths of 1550 nm and 1625 nm, the loss of the light of a case where the diameter of the first core 11 was bent to be 60 mm was checked. Furthermore, for light of the LP01 mode having wavelengths of 1550 nm and 1625 nm, the loss of the light of a case where the diameter of the second core 12 was bent to be 60 mm was checked. Furthermore, the 1 m cutoff wavelength of the LP21 mode of the first core 11 was checked, and the 1 m cutoff wavelength of the LP11 mode of the second core 12 was checked. A result thereof is illustrated in Table 1.

TABLE 1

|  | MFD [μm] | | $A_{eff}$ [μm²] | | Bending Loss [dB/m] | | Cutoff [nm] |
| --- | --- | --- | --- | --- | --- | --- | --- |
| Wavelength [nm] | 1550 | 1625 | 1550 | 1625 | 1550 | 1625 | — |
| First Core | 10.7 | 10.9 | 98.3 | 101.2 | <0.01 | <0.01 | 1500 |
| Second Core | 10.2 | 10.8 | 78.0 | 85.8 | 0.03 | 0.1 | 1080 |

Next, a part of the multicore fiber described above was stretched under Conditions 1 and 2 in Table 2.

TABLE 2

|  | Center Wavelength [nm] | Tapered Portion Length [mm] | Small Diameter Portion Length [mm] | Draw Ratio |
| --- | --- | --- | --- | --- |
| Condition 1 | 1550 | 4.0 | 4.7 | 1.42 |
| Condition 2 | 1595 | 4.0 | 4.9 | 1.38 |

Then, light formed toy light of the LP11 mode having a wavelength of 1550 nm was caused to be incident on the first core 11 of the multicore fiber 1 including a spot stretched under Condition 1, and a selection ratio between the power level of light of the LP11 mode emitted from the first core 11 and the power level of light of the LP01 mode emitted from the second core 12 was measured in the demultiplexing process. As a result, it has been understood that a selection ratio of 1 dB can be realized. In addition, light formed by light of the LP01 mode having a wavelength of 1550 nm was caused to be incident on the second core of the multicore fiber 1 including a spot stretched under Condition 1, and a selection ratio between the power level or light of the LP11 mode emitted from the first core 11 and the power level of light of the LP01 mode emitted from the second core 12 was measured in the multiplexing process. As a result, it has been understood that a selection ratio of 15 dB can be realized.

Next, light of the LP11 mode having a wavelength of 1500 nm to 1639 nm was caused to be incident on the first core 11 of each of the multicore fiber 1 including a spot stretched under Condition 1 and the multicore fiber 1 including a spot stretched under Condition 2, and coupling efficiency between light of the LP11 mode of the first core 11 and light of the LP01 mode of the second core 12 were checked in the demultiplexing process. Similarly, light of the LP01 mode having a wavelength of 1500 nm to 1630 nm was caused to be incident on the second core 12 of each of the multicore fiber 1 including a spot stretched under Condition 1 and the multicore fiber 1 including a spot stretched under Condition 2, and coupling efficiency between light of the LP11 mode of the first core 11 and light of the LP01 mode of the second core 12 was checked in the multiplexing process. Here, the coupling efficiency is acquired by taking a ratio between the power level of light that is acquired by subtracting an excess loss from the power level of light incident on the second core 12 and the power level of light emitted from the first core 11 in the multiplexing process and is acquired by acquiring a ratio between the power level of light acquired by subtracting an excess loss from the power level of light incident on the first core 11 and the power level of light emitted from the second core 12. The results thereof were illustrated in FIG. 13.

Figure 13:
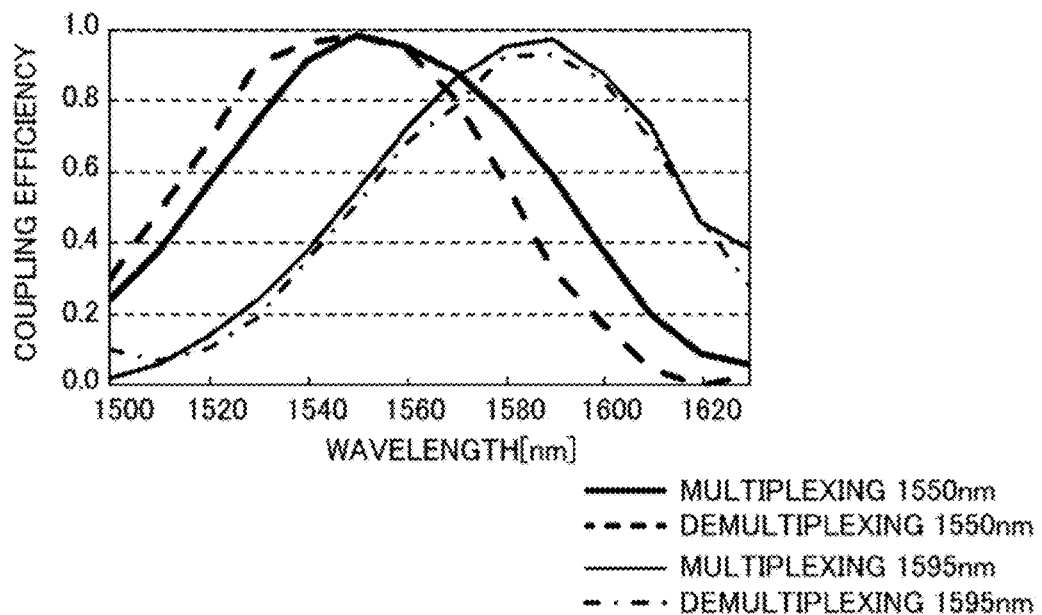
FIG. 13 is a diagram that illustrates a relation between a wavelength and a coupling efficiency.

As illustrated in FIG. 13, the multicore fiber 1 satisfying Condition 1 has high coupling efficiency of 95% or more for a wavelength of about 1550 nm. In addition, the multicore fiber 1 satisfying Condition 2 has high coupling efficiency of 88% or more for a wavelength of about 1590 nm.

Example 2

In this example, the multicore fiber 2 according to the second embodiment was produced, and it was checked whether mode multiplexing/demultiplexing could be performed by the produced multicore fiber 2.

<Design of Multicore Fiber>

The first core 11 and the second core 12 were designed similar to the first core 11 and the second core 12 of Example 1. The multicore fiber 2 of this example includes the third core 13 arranged at a position different from the position of the second core 12 by 90 degrees using the center oil the first core 11 as a reference. The design of the third core 13 was similar to that of the second core 12.

Crosstalk between the first core 11 and the second core 12 and crosstalk between the first core 11 and the third core 13 were similar to those illustrated in FIG. 9 of Example 1. Accordingly, in the large diameter portion, an core pitch between the first core 11 and the second core 12 was set similar to Example 1, and an core pitch between the first core 11 and the third core 13 is set similar to Example 1. However, in this example, it is necessary to consider the crosstalk between the second core 12 and the third core 13.

Figure 14:
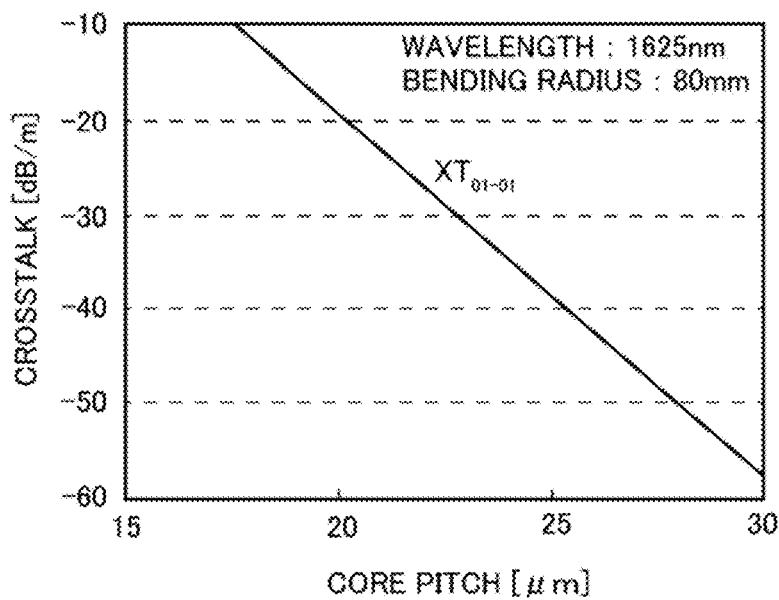
FIG. 14 is a diagram that illustrates a relation between inter-core crosstalk $XT_{01\text{-}01}$ and an core pitch of a second core and a third core for the LP01 mode when a bending diameter of a multicore fiber is 80 mm, and a wavelength is 1625 nm in Example 2.

FIG. 14 is a diagram that illustrates a relation between the inter-core crosstalk $XT_{01\text{-}01}$, which is crosstalk between the LP01 modes, between the second core 12 and the third core 13 and an core pitch when the bending diameter of the multicore fiber 2 is 80 mm, and the wavelength is 1625 nm. In a case where the core pitch between the first core 11 and the second core 13 and the core pitch between the first core 11 and the third core 13 are 25 μm as described above, the core pitch between the second core 12 and the third core 13 is about 35.4 μm. By considering that the selection ratio of a general mode multiplexer/demultiplexer is about 25 dB, and the use length of this device is 1 m or less, crosstalk of −30 dB/m may be secured. Based on FIG. 14, it has been checked that, in a case where the core pitch between the second core 12 and the third core 13 is about 35.4 μm, the crosstalk is suppressed to be lower than −30 dB/m. Accordingly, in the large diameter portion, it has been checked that the core pitch between the first core 11 and the second core 12 and the core pitch between the first, core 11 and the third core 13 may be set to 25 μm.

The design of the draw ratio and the design of the tapered portion were made similar to the design of the draw ratio and the design of the tapered portion of Example 1.

<Generation and Evaluation of Multicore-Fiber>

Next, based on the design determined as above, a multicore fiber that was formed only from a large diameter portion in which a tapered portion and a small diameter portion were not formed was generated. In this multicore fiber, both the core pitch between the first core 11 and the second core 12 and the core pitch between the first core 11 and the third, core 13 were 25.0 μm. In addition, the core pitch between the second core 12 and the third core 13 was 35.4 μm. An angle formed by the second core 12 and the third core 13 using the center of the first core 11 as a reference was 88.7°. The crosstalk $XT_{01\text{-}01}$ between the core 12 and the core 13 was −29 dB/m for a wavelength of 1625 nm and a bending diameter of 120 mm.

In addition, the mode field diameter MFD and the effective area $A_{eff}$ of each of the first core 11, the second core 12, and the third core 13 were checked for light of the LP01 mode having wavelengths of 1550 nm and 1625 nm. In addition, for light of the LP11 mode having wavelengths of 1550 nm and 1625 nm, the loss of the light of a case where the diameter of the first core 11 was bent to be 60 mm was checked. Furthermore, for light of the LP01 mode having a wavelength of 1550 nm, the loss of the light of a case where the diameter of each of the second core 12 and the third core 13 was bent to be 60 mm was checked, and, for light of the LP01 mode having a wavelength of 1625 nm, the loss of the light of a case where the diameter was bent to be 60 mm was checked. In addition, the 2 m cutoff wavelength of the LP21 mode of the first core 11 was checked, and the 2 m cutoff wavelength of the LP11 mode of each of the second core 12 and the third core 13 was checked. Results thereof are illustrated in Table 3.

TABLE 3

| | MFD [μm] | | $A_{eff}$ [μm$^2$] | | Bending Loss [dB/m] | | Cutoff [nm] |
|---|---|---|---|---|---|---|---|
| Wavelength [nm] | 1550 | 1625 | 1550 | 1625 | 1550 | 1625 | — |
| First Core | 10.9 | 11.1 | 98.7 | 105.4 | <0.01 | <0.01 | 1509 |
| Second Core | 10.2 | 10.7 | 77.2 | 85.5 | <0.01 | 0.05 | 1057 |
| Third Core | 10.2 | 10.7 | 77.3 | 85.3 | 0.04 | 0.17 | 1057 |

Next, the multicore fiber described above was stretched under a condition similar to Condition 1 of Example 1.

Then, light of the LP11 mode having a wavelength of 1550 nm was caused to be incident on the first core 11 of the multicore fiber 2 including a stretched spot. However, this light is light that passes through a polarizer, a ¼ wavelength plate, a half-wave plate, and a phase plate, and the field of the light of the LP11 mode that is incident on the first core 11 is rotated according to the rotation of the phase plate. Then, the power level of light emitted from each of the second core 12 and the third core 13 was measured. A result thereof is illustrated in FIG. 15.

Figure 15:
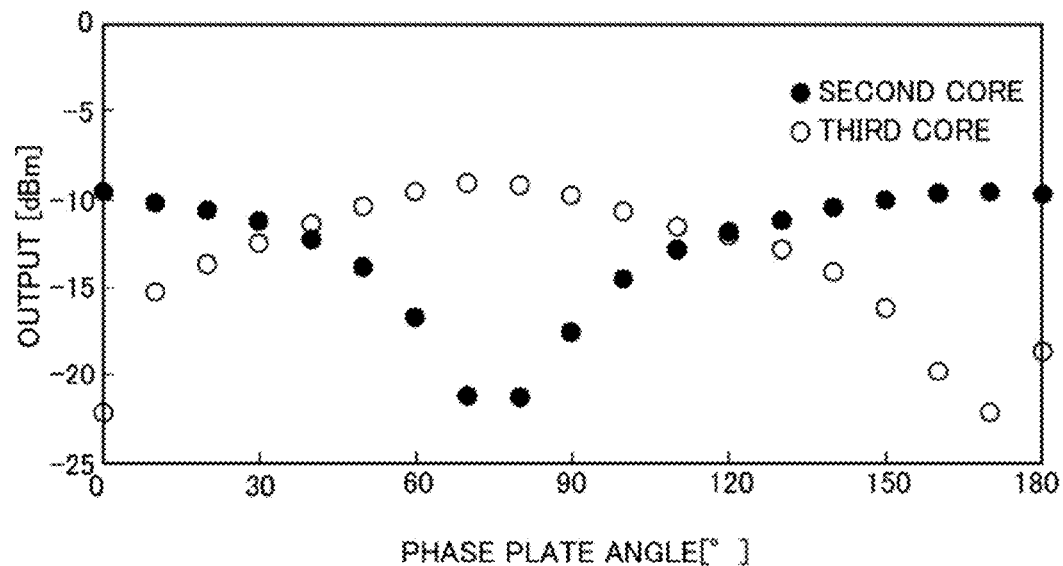
FIG. 15 illustrates the power levels of light emitted from the second core 12 and light emitted from the third core 13 in Example 2.

As illustrated in FIG. 15, an angle of the phase plate at which the power level of light incident on the second core 12 is a maximum and an angle of the phase plate at which the power level of light incident on the third core 13 is a maximum has a difference of about 90 degrees. Accordingly, it has been checked that the light of the LP11 mode that is incident on the first core 11 can be demultiplexed into the second core 12 and the third core 13 as light of the LP11a mode and light of the LP11b mode of which fields are different from each other by 90 degrees.

Next, light of the LP01 mode was caused to be incident on the second core 12 of the multicore fiber 2 including a stretched spot. However, this light is light that passes through a polarizer, a ¼ wavelength plate, and a half-wave plate, and the polarized wave of light incident on the second core 12 is rotated according to the rotation of the polarizer. Then, the polarizer was rotated by 0 degrees, 45 degrees, 90 degrees, 135 degrees, and 180 degrees, the power level of light emitted from the second core 12 and the first core 11 was measured for each angle, and the power level of light emitted only from the first core 11 was measured for each angle. Then, a coupling efficiency according to the ratio between the power level of light emitted from the second core 12 and the first core 11 and the power level of light emitted only from the first core 11 was acquired for each wavelength. A result thereof is illustrated in FIG. 16.

In addition, light similar to the light that was incident on the second core 12 was caused to be incident on the third core 13 of the multicore fiber 2 including a stretched spot. Then, the polarizer was rotated by the angles described above, the power level of light emitted from the third core 13 and the first core 11 was measured for each angle, and the bower level of light emitted only from the first core 11 was measured for each angle. Then, a coupling efficiency according to the ratio between the power level of light emitted from the third core 13 and the first core 11 and the power level of light emitted only from the first core 11 was acquired for each wavelength. A result thereof is illustrated in FIG. 17.

Figure 16:
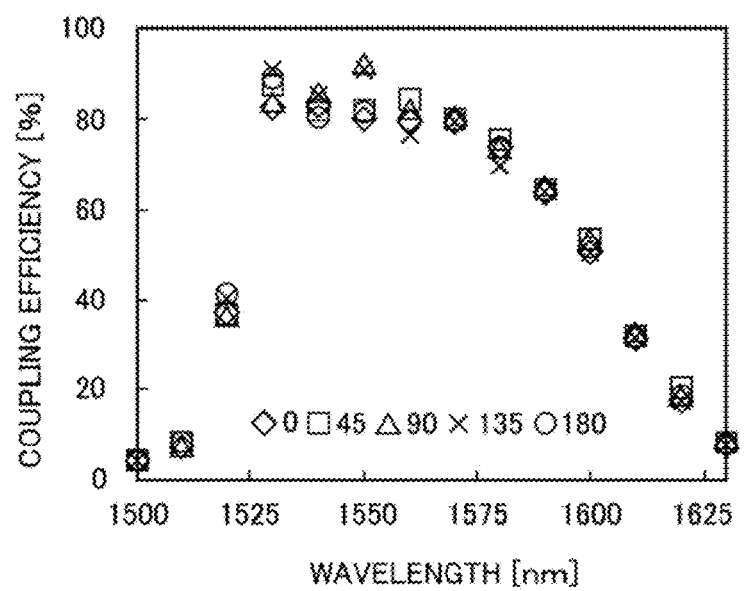
FIG. 16 is a diagram that illustrates a coupling efficiency according to a ratio between the power level of light emitted from the second core and a first core and the power level of light emitted only from the first core for each wavelength in Example 2.
Figure 17:
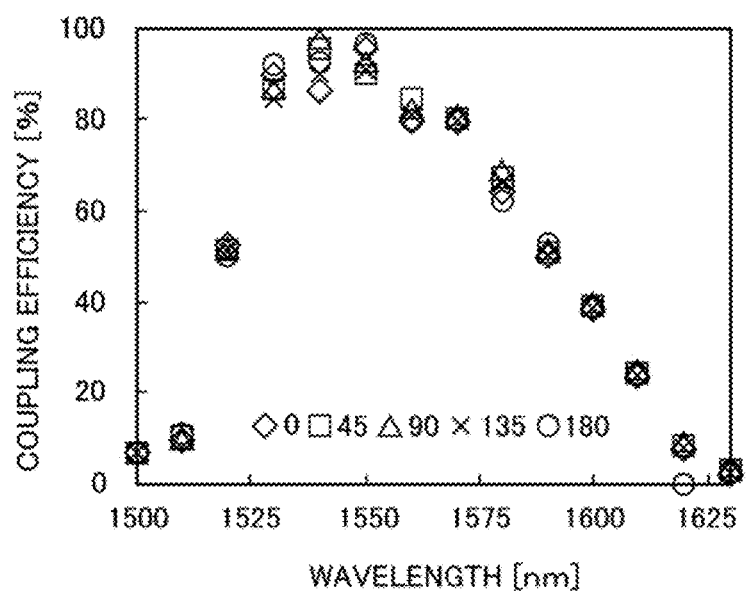
FIG. 17 is a diagram that illustrates a coupling efficiency according to a ratio between the power level of light emitted from the third core 13 and the first core 11 and the power level of light emitted only from the first core 11 for each wavelength in Example 2.

As illustrated in FIGS. 16 and 17, in any one of the case where light is incident on the second core 12 and the case where light is incident on the third core 13, the coupling efficiency was acquired to be 79% or more for a wavelength of 1550 nm as a result. In addition, there was no big difference between the coupling efficiency profiles between the case where light is incident on the second core 12 and the case where light is incident on the third core 13.

Figure 18:
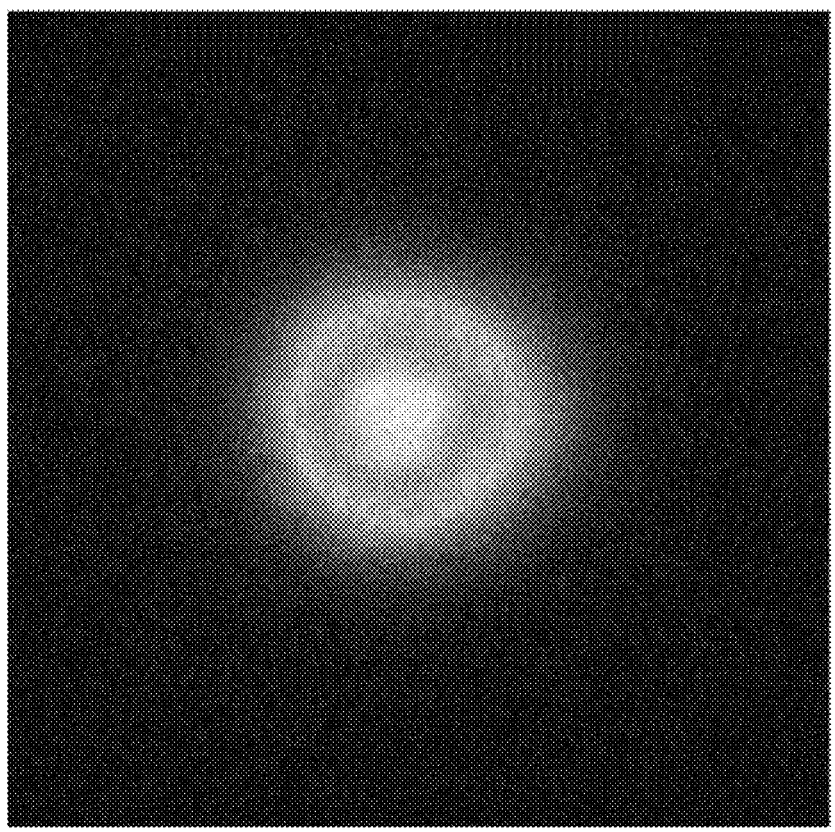
FIG. 18 is a photograph that illustrates an NFP (Near Field Pattern) of light in the first core of a multicore fiber produced in Example 2.
Figure 19:
FIG. 19 is a photograph that illustrates an NFP of light in the second core of the multicore fiber produced in Example 2.
Figure 20:
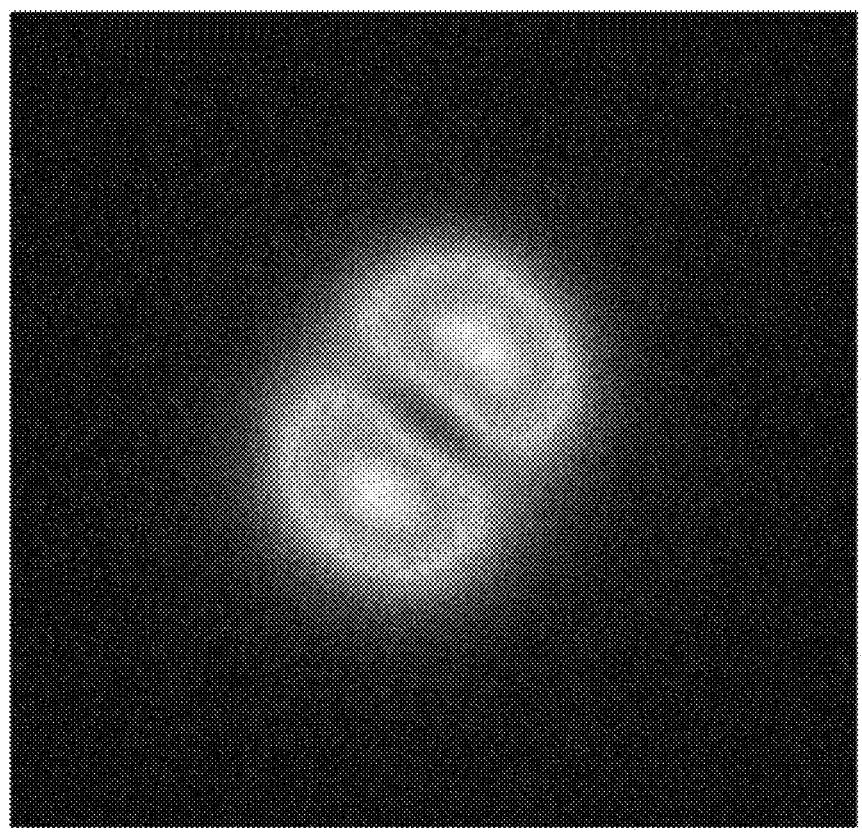
FIG. 20 is a photograph that illustrates an NFP of light in the third core of the multicore fiber produced in Example 2.

FIGS. 18 to 20 illustrate Near Field Patterns (NFPs) of light in the multicore fiber 2 produced in this example. More specifically, FIG. 18 illustrates an NPF of light in the first core 11, FIG. 19 illustrates an NFP of light in the second core 12, and FIG. 20 illustrates an NFP of light in the third core 13.

Based on FIGS. 16, 17, and 18 to 20, it has been checked that light of the LP01 mode, light of the LP11a mode and light of the LP11b mode can be selectively multiplexed using the multicore fiber 2.

As above, it has been checked that mode multiplexing/demultiplexing can be performed using the multicore fiber of the present invention.

As above, conditions for which the effective area of incident light and the effective area of emitted light are the same for the light of the LP01 mode and the light of the LP11 mode were acquired.

An optical device according to the present invention realizes a mode multiplexer/demultiplexer that can be decreased in size using a multicore fiber and can be used for the industry of optical communication.

REFERENCE SIGNS LIST 1 to 6 . . . multicore fiber
11 . . . first core
12 . . . second core
13 . . . third core
14 . . . fourth core
15 . . . fifth core
20 . . . cladding
31 . . . large diameter portion
32 . . . tapered portion
33 . . . small diameter portion

The invention claimed is:

1. A multicore fiber comprising:
a first core that propagates light of up to an x-th order LP mode (here, x is an integer of "2" or more); and
a second core that propagates light of up to a y-th order LP mode (here, y is an integer of "1" or more),
wherein a different-mode interaction section in which a propagation constant of light of an $x_1$-th order LP mode of the first core (here, $x_1$ is an integer of "1" or more and x or less) and a propagation constant of light of a $y_1$-th order LP mode of the second core (here, $y_1$ is an integer of "1" or more and y or less other than $x_1$) coincide with each other and a different-mode non-interaction section in which a propagation constant of light of each LP mode of the first core and a propagation constant of light of each LP mode of the second core are configured not to coincide with each other are arranged,
wherein the multicore fiber further comprising:
a third core that propagates light of up to a z-th order LP mode (here, z is an integer of "1" or more) and is arranged at a position different from a position of the second core by a predetermined angle using the center of the first core as a reference,
wherein, in the different-mode interaction section, the propagation constant of the light of the $x_1$-th order LP mode of the first core and a propagation constant of light of a $z_1$-th order LP mode of the third core (here, $z_1$ is an integer of "1" or more and z or less other than $x_1$) coincide with each other,
in the different-mode non-interaction section, a propagation constant of light of each LP mode of the first core and a propagation constant of light of each LP mode of the third core do not coincide with each other, and
the light of the $x_1$-th order LP mode is configured to be light acquired by adding two units of light of a same LP mode, which have mutually-different energy distributions in the case of being rotated to be different from each other by the predetermined angle using the center of the first core as a reference, in a state of being rotated to be different from each other by the predetermined angle using the center of the first core as a reference.

2. The multicore fiber according to claim 1, wherein the predetermined angle is 90 degrees, and the $x_1$-th order LP mode is a second-order LP mode.

3. The multicore fiber according to claim 1, wherein the predetermined angle is 45 degrees, and the $x_1$-th order LP mode is a third-order LP mode.

4. The multicore fiber according to claim 1, wherein $y_1$ and $z_1$ are the same.

5. The multicore fiber according to claim 1, wherein $y_1$ and $z_1$ are "1".

6. The multicore fiber according to claim 1, wherein the first core is positioned at the center of a cladding.

7. The multicore fiber according to claim 1, wherein the different-mode interaction section is formed as a part of the different-mode non-interaction section is stretched.

8. The multicore fiber according to claim 1, wherein the number of LP modes of light propagating through each core in a used wavelength band is not changed between the different-mode interaction section and the different-mode non-interaction section.

9. A multicore fiber comprising:
a first core that propagates light of up to an x-th order LP mode (here, x is an integer of "2" or more); and
a second core that propagates light of up to a y-th order LP mode (here, y is an integer of "1" or more),
wherein a different-mode interaction section in which a propagation constant of light of an $x_1$-th order LP mode of the first core (here, $x_1$ is an integer of "1" or more and x or less) and a propagation constant of light of a $y_1$-th order LP mode of the second core (here, $y_1$ is an integer of "1" or more and y or less other than $x_1$) coincide with each other and a different-mode non-interaction section in which a propagation constant of light of each LP mode of the first core and a propagation constant of light of each LP mode of the second core are configured not to coincide with each other are arranged,
wherein the multicore fiber further comprising:
a third core that propagates light of up to a z-th order LP mode (here, z is an integer or "1" or more),
wherein x is an integer of "3" or more,
in the different-mode interaction section, a propagation constant of light of an $x_2$-th order LP mode of the first core (here, $x_2$ is an integer of "1" or more and x or less other than $x_1$) and a propagation constant of light of a $z_1$-th order LP mode of the third core (here, $z_1$ is an integer of "1" or more and z or less other than $x_1$ and $x_2$) coincide with each other, and in the different-mode non-interaction section, a propagation constant of light of each LP mode of the first core and a propagation constant of light of each LP mode of the third core do not coincide with each other.

10. The multicore fiber according to claim 9, wherein $y_1$ and $z_1$ are the same.

11. The multicore fiber according to claim 9, wherein $y_1$ and $z_1$ are "1".

12. The multicore fiber according to claim 9, wherein the first core is positioned at the center of a cladding.

13. The multicore fiber according to claim 9, wherein the different-mode interaction section is formed as a part of the different-mode non-interaction section is stretched.

14. The multicore fiber according to claim 9, wherein the number of LP modes of light propagating through each core in a used wavelength band is not changed between the different-mode interaction section and the different-mode non-interaction section.

15. A multicore fiber comprising:
a first core that propagates light of up to an x-th order LP mode (here, x is an integer of "2" or more);
a second core that propagates light of up to a y-th order LP mode (here, y is an integer of "1" or more); and
a common cladding surrounding the first core and the second core,
wherein a different-mode interaction section in which a propagation constant of light of an x1-th order LP mode of the first core (here, x1 is an integer of "1" or more and x or less) and a propagation constant of light of a y1-th order LP mode of the second core (here, y1 is an integer of "1" or more and y or less other than x1) coincide with each other and a different-mode noninteraction section in which a propagation constant of light of each LP mode of the first core and a propagation constant of light of each LP mode of the second core are configured not to coincide with each other are arranged, wherein the first core is positioned at the center of the common cladding, wherein a cutoff wavelength of the LP21 mode of the first core is larger than a cutoff wavelength of the LP21 mode of the second core in the different-mode non-interaction section.

16. The multicore fiber according to claim 15, wherein $y_1$ and $z_1$ are the same.

17. The multicore fiber according to claim 15, wherein $y_1$ and $z_1$ are "1".

18. The multicore fiber according to claim 15, wherein the first core is positioned at the center of a cladding.

19. The multicore fiber according to claim 15, wherein the different-mode interaction section is formed as a part of the different-mode non-interaction section is stretched.

20. The multicore fiber according to claim 15, wherein the number of LP modes of light propagating through each core in a used wavelength band is not changed between the different-mode interaction section and the different-mode non-interaction section.

* * * * *